United States Patent [19]

Linz et al.

[11] Patent Number: 5,237,324
[45] Date of Patent: Aug. 17, 1993

[54] SYSTEM AND METHOD FOR PRODUCING BASEBAND ANALOG MODULATION SIGNALS

[75] Inventors: Alfredo R. Linz; Alan F. Hendrickson, both of Austin, Tex.

[73] Assignee: Advanced Micro Devices, Inc., Sunnyvale, Calif.

[21] Appl. No.: 754,644

[22] Filed: Sep. 4, 1991

[51] Int. Cl.$^5$ .................. H03M 1/66; H03M 1/48
[52] U.S. Cl. ........................... 341/147; 341/117
[58] Field of Search ............ 341/147, 111–117, 341/144, 126, 141; 364/608, 718, 722, 852

[56] References Cited

U.S. PATENT DOCUMENTS

| | | | |
|---|---|---|---|
| 3,744,050 | 7/1973 | Hedrick | 341/117 |
| 3,772,681 | 11/1973 | Skingle | 341/147 X |
| 3,794,995 | 2/1974 | Thompson | 341/147 X |
| 3,905,030 | 9/1975 | Lavanant et al. | 341/147 X |
| 4,039,806 | 8/1977 | Fredriksson et al. | 341/147 X |
| 4,160,245 | 7/1979 | Scott | 341/117 |
| 5,111,202 | 5/1992 | Rivera et al. | 341/139 |

Primary Examiner—Sharon D. Logan
Attorney, Agent, or Firm—Foley & Lardner

[57] ABSTRACT

A system provides I and Q baseband analog modulation signals for use in GMSK modulation responsive to serial bits of digital data. The I baseband modulation signal is represented by $I(t) = \cos[2\pi f_m \int g(t)dt]$ and the Q baseband modulation signal is represented by $Q(t) = \sin[2\pi f_m \int g(t)dt]$, wherein $f_m$ is the modulating frequency and $g(t)$ is a filtered version of the serial bits of digital data. The system includes an input for receiving the serial bits of digital data, a memory including addressable memory locations for storing data representing the waveform amplitudes of the I and Q modulation baseband analog signals, and an address generator for addressing selected ones of the memory locations responsive to the serial bits of digital data. The system further includes digital to analog converters coupled to the memory for receiving the data stored at the memory locations addressed by the address generator and for converting the data to the I and Q modulation baseband analog signals.

69 Claims, 11 Drawing Sheets

SYSTEM AND METHOD FOR PRODUCING BASEBAND ANALOG MODULATION SIGNALS

BACKGROUND OF THE INVENTION

The present invention generally relates to a system and method for producing baseband analog modulation signals in response to serial bits of digital data. The present invention more particularly relates to such a system and method for use in producing in-phase (I) and quadrature (Q) baseband analog modulation signals for use in Gaussian Minimum Shift Keying (GMSK).

GMSK modulation is well known in the art. It is a special case of Frequency Shift Keying (FSK) modulation. It has the advantage of having a narrower spectrum, which makes it useful in radio communication.

In FSK modulation, the output frequency f(t) is the carrier frequency, $f_c$, shifted up or down the spectrum by a value $f_m$, the modulating frequency. Such FSK modulation is produced in digital systems in the following manner.

Given a digital binary data stream b(n), a series of rectangular pulses p(t) with duration T and values of $+1$ or $-1$ can be created. The pulses p(t) may be represented by the equation below.

$$p(t) = \Sigma b'(n) P(t-nT), n=0, \ldots$$

Wherein:
- P(t) is the unit pulse of amplitude 1 and width T, centered at $t=0$;
- b'(n) is $+1$ if b(n) equals 1; and
- b'(n) is equal to $-1$ if b(n) is equal to 0.

The waveform p(t) is used to modulate the instantaneous frequency of a sinusoidal carrier of frequency $f_c$. The instantaneous angular frequency is the time derivative of the phase, so the phase of the carrier is made equal to $\Phi(t) = (2\pi f_c) t + 2\pi f_m \int p(t) dt$. Its p(t)dt. Its time derivative is seen to be $w(t) = d\Phi(t)/dt = 2\pi f(t) = 2\pi f_c + 2 \times \pi f_m p(t)$.

The instantaneous frequency f(t) can thus be seen to vary by an amount $+$ or $-f_m$ around a center frequency $f_c$. The generated waveform will be phase-continuous if the integral of p(t) is continuous. The slope of the waveform at the bit boundaries is, however, not continuous and causes the spectrum to be poorly confined. In radio communication this means the energy outside the main spectral lobe will interfere with adjacent channels, which is generally undesirable.

To reduce the width of the spectrum of Frequency Shift Keying, Minimum Shift Keying (MSK) has been developed. Here, the two frequencies $f_c+f_m$ and $f_c-f_m$ are chosen to be as close as possible while still providing waveforms that are orthogonal over the one bit interval T. This requires the interval T to contain N cycles of the waveform of frequency $f_c-f_m$ and $N+\frac{1}{2}$ cycles of the waveform of frequency $f_c+f_m$. The frequency difference is given below.

$$\Delta f = f2 - f1 = 2f_m = (N+\tfrac{1}{2})/T - N/T = 1/(2T)$$

The above relationship holds for any center frequency $f_c$ and depends only upon the value of T. For example, if T corresponds to a signaling rate of 72,000 bits per second, this results in the modulating frequency equalling 18 kilohertz. In this case, the phase change during a bit interval of duration T is $+$ or $-\pi/2$ for $p(t)=+$ or $-1$ respectively.

For certain radio communication applications, such as cordless telephony, the channel width in the frequency domain is 100 kilohertz. Unfortunately, Minimum Shift Keying, even with the minimum frequency difference, produces a spectrum which still contains unacceptably high energy in the adjacent channel regions in the ranges above $f_c+50$ kilohertz and below $f_c-50$ kilohertz. To further reduce this effect, Tamed Frequency Modulation (TMF) has been developed wherein the binary digital serial data p(t) is low-pass filtered. Gaussian Minimum Shift Keying is a form of Tamed Frequency Modulation and uses a Gaussian filter for the low-pass filter. Such filters have a Gaussian impulse response and also a Gaussian spectrum which minimize the product of the RMS duration of the impulse response and the RMS spectral width. This permits faster signaling in the time domain while producing the narrowest spectrum. As is well known in the art, Gaussian filters may be approximated by linear phase (Bessel) filters, with a typical order of 8, and typically have cutoff frequencies anywhere between 0.4 and 1.0 times the bit rate of 1/T.

In Gaussian Minimum Shift Keying, the phase of the carrier is made equal to $\Phi(t)$ as represented in the equation below.

$$\Phi(t) = 2\pi f_c t + 2\pi f_m \int g(t) dt$$

Wherein: g(t) is the low-pass filtered version of p(t).

In Gaussian Minimum Shift Keying, the phase change during a bit interval T depends on the shape of g(t) during that interval and will be $+$ or $-\pi/2$ only if g(t) is equal to 1 or $-1$ during all the interval.

For practicing Gaussian Minimum Shift Keying, the modulated signal may be represented by the equation below.

$$y(t) = \cos[\Phi(t)] = \cos [2\pi f_c t + 2\pi f_m \int g(t) dt]$$

The modulated signal can be generated directly by producing the value of $\Phi(t)$ and using that value in a look up table such as a read only memory (ROM) table containing corresponding cosine values. This requires integrating a constant phase increment corresponding to $2\pi f_c$ which is modified in time by an amount representing $2\pi f_m g(t)$. This approach has been practiced in the prior art and has exhibited a significant problem when the sampling rate, which must exceed two times $f_c+f_m$, is too high. Another problem with this implementation has been the required large size of the ROM.

To overcome the problems of sampling rate and ROM size referred to above, the equivalent baseband signal (I-Q) method was developed. Here, the carrier and the modulating frequencies are separated using a trigonometric identity on y(t) as shown below.

$$y(t) = \cos [2\pi f_c t] \cos[2\pi f_m \int g(t) dt] - \sin [2\pi f_c t] \sin[2\pi f_m \int g(t) dt]$$

$$y(t) = -Q(t) \sin[2\pi f_c t] + I(t) \cos[2\pi f_c t]$$

As can be seen from the above, the carrier and the modulating frequencies have been separated. The I component and the Q component can be expressed as shown below.

$$I(t) = \cos [2\pi f_m \int g(t) dt]$$

$$Q(t) = \sin [2\pi f_m \int g(t) dt]$$

I(t) is referred to in the art as the in-phase component and Q(t) is referred to in the art as the quadrature component of the modulating signals and are known as equivalent baseband signals. The mixing, as well known in the art, can now be done in the analog domain to obtain y(t). I and Q have been generated by integrating and scaling the modulating signal to obtain the phase and then finding the cosine and sine of the phase by using a look up table in ROM, for example. This is substantially more convenient than the previously referred to method from the point of view of digital synthesis since the phase waveform has a relatively low frequency. As will be explained in greater detail hereinafter, ROM size continues to pose a problem. If a smaller ROM is utilized, truncation of the phase is required which produces errors that manifest themselves as spurs in the output spectrum. Techniques to correct this effect are known but involve multiplication operations which are not always practical to implement in some applications. Another problem with this method is that the binary waveform p(t) must still be filtered using a low-pass filter implemented either as a real digital filter or as a filtered waveform synthesizer using ROMs. However, utilizing ROMs to simulate the filter characteristics may require toleration of some time and amplitude quantization.

As will be seen hereinafter, the present invention circumvents the errors caused by prior art methods in producing I and Q analog baseband modulating signals which separate the filtering from the integration and the sine and cosine computations. As will be described hereinafter, and in accordance with the present invention, data representing the waveform amplitudes of the I and Q modulation baseband analog signals are stored in a ROM and accessed for direct synthesis of the I and Q signals in hardware. The ROM may be of very economical size including on the order of 256 addressable memory locations with each location storing a 6-bit sample word. In addition, the control logic is rendered extremely less complicated.

SUMMARY OF THE INVENTION

The present invention therefore provides a system for producing a modulation baseband analog signal responsive to serial bits of digital data. The system includes input means for receiving the serial bits of digital data, memory means including addressable memory locations for storing data representing the waveform amplitudes of the modulation baseband analog signal, and addressing means for addressing selected memory locations responsive to the serial bits of digital data. The system further includes digital to analog conversion means coupled to the memory means for receiving the data stored at the memory locations addressed by the addressing means and for converting the data to the modulation baseband analog signal.

The present invention more particularly provides a system for providing I and Q baseband analog modulation signals for use in GMSK modulation responsive to serial bits of digital data wherein the I baseband modulation signal is represented by $I(t) = \cos[2\pi f_m \int g(t)dt]$, the Q baseband modulation signal is represented by $Q(t) = \sin[2\pi f_m \int g(t)dt]$, and wherein $f_m$ is the modulating frequency and g(t) is a filtered version of the serial bits of digital data p(t). The system includes input means for receiving the serial bits of digital data, memory means including addressable memory locations for storing data representing the waveform amplitudes of the I and Q modulation baseband analog signals, and addressing means for addressing selected ones of the memory locations responsive to the serial bits of digital data. The system further includes digital to analog conversion means coupled to the memory means for receiving the data stored at the memory locations addressed by the addressing means and for converting the data to the I and Q modulation baseband analog signals.

The I and Q modulation baseband analog signals are divisible into a finite number of waveform segments with each segment corresponding in length to one bit period. The memory means includes a plurality of memory portions with each memory portion storing data representing a respective one of the waveform segments. The system may further include waveform segment select means for causing the addressing means to address the memory locations of one of the memory portions for the I signal and the memory locations of one of the memory portions for the Q signal responsive to the serial bits of digital data during each bit period. Preferably, the waveform segment select means is responsive to the last three bits of the serial bits of digital data for causing the addressing means to address the memory locations of the memory portions.

To reduce the number of waveform segments which must be stored the system may further include read direction control means for causing the addressing means to address the addressable memory in reverse order during selected ones of the bit periods and polarity control means for causing the polarity of the waveform segments to be inverted during selected ones of the bit periods.

The invention further provides a method of producing a modulation baseband analog signal responsive to serial bits of digital data. The method includes the steps of providing a memory including addressable memory locations, storing data representing the waveform amplitudes of the modulation baseband analog signal in the memory, and receiving the serial bits of digital data. The method further includes the steps of addressing selected ones of the memory locations responsive to the serial bits of digital data and converting the data stored at the addressed memory locations to analog form for providing the modulation baseband analog signal.

The present invention further provides a method for providing I and Q baseband analog modulation signals for use in GMSK modulation responsive to serial bits of digital data. The I baseband modulation signal is represented by $I(t) = \cos[2\pi f_m \int g(t)dt]$ and the Q baseband modulation signal is represented by $Q(t) = \sin[2\pi f_m \int g(t)dt]$, where $f_m$ is the modulating frequency and g(t) is a filtered version of the serial bits of digital data. The method includes the steps of receiving the serial bits of digital data, providing a memory including addressable memory locations, and storing data representing the waveform amplitudes of the I and Q modulation baseband analog signals in the memory. The method further includes the steps addressing selected ones of the memory locations responsive to the serial bits of digital data and converting the data stored at the addressed memory locations to analog form for providing the I and Q modulation baseband analog signals.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference characters identify identical elements, and wherein:

DETAILED DESCRIPTION OF THE PREFERRED EMBODIMENT

Figure 1:
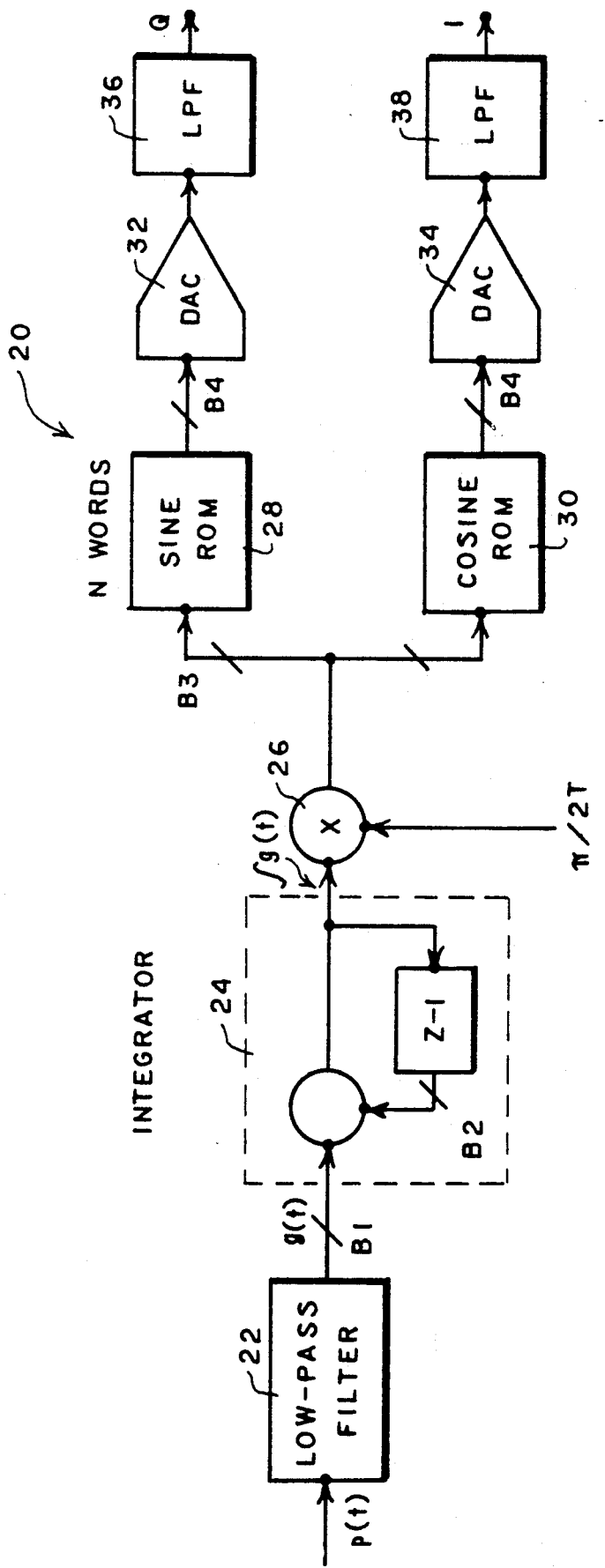
FIG. 1 is a block diagram of a prior art arrangement for generating I and Q baseband modulation signals responsive to serial bits of digital data.

Referring now to FIG. 1, it illustrates in block diagram form, a prior art arrangement for generating I and Q baseband modulating signals in response to serial bits of digital data p(t). The arrangement 20 illustrated in FIG. 1 includes a low-pass filter 22, an integrator 24, a multiplier 26, a sine ROM 28, a cosine ROM 30, a first digital to analog converter 32, a second digital to analog converter 34, and first and second low-pass filters 36 and 38 respectively. The output of low-pass filter 36 provides the Q signal and output of low-pass filter 38 provides the I signal.

The low-pass filter 22 can be implemented either as a real digital filter or as a filtered waveform synthesizer using ROMs. The latter approach is more flexible since it can simulate a variety of filtered characteristics and is more economical if some time and amplitude quantization can be tolerated. The output of the low-pass filter 22 consists of data words of B1-bits in length. The integrator 24 may be implemented as an accumulator having an output representing the phase. It requires an adder and accumulator of B2-bits. The B2-bit size is determined by the fact that the accumulator should count from zero to a number representing $2\pi$ and then wrap around to zero. This occurs for samples B1-bits in size of maximum value. For example, if 64 samples per bit time T are used, and the maximum phase change is $\pi/2$ per bit, then 256 samples of B1-bits in size and maximum value should result in overflow ($B2=B1+8$). If only 5-bits are used for B1, which is a relatively coarse quantization, B2 will then be equal to thirteen. Of these 13-bits, the two most significant bits would be used to determine quadrant and polarity sign, leaving 11-bits for addressing the ROM. Even though the ROM need only contain samples for a quarter of a sign wave, if one sample was stored for every required phase value, a 2048 word ROM would be required. This problem may be avoided by storing fewer values in the ROM as for example using only a number of bits $B_3$ for addressing the ROMs which is less than B2. This requires truncation of the phase which will produce errors that manifest themselves as spurs in the output spectrum as previously mentioned. Multiplication by $\pi/2$ T is implicit in the integrator operation; it is achieved by making the accumulator overflow every 4T.

As can thus be seen from FIG. 1, in the prior art arrangement, the low-pass filter 22, integrator 24, and multiplier 26 are combined together for calculating the phase. The phase is then used to determine the sine and cosine for the Q and I signals respectively. The samples from the sine ROM 28 and cosine ROM 30 are then converted to analog form by the digital to analog converters 3 and 34 respectively and finally filtered by low-pass filters 36 and 38 respectively to produce the Q and I baseband modulating signals.

Figure 2:
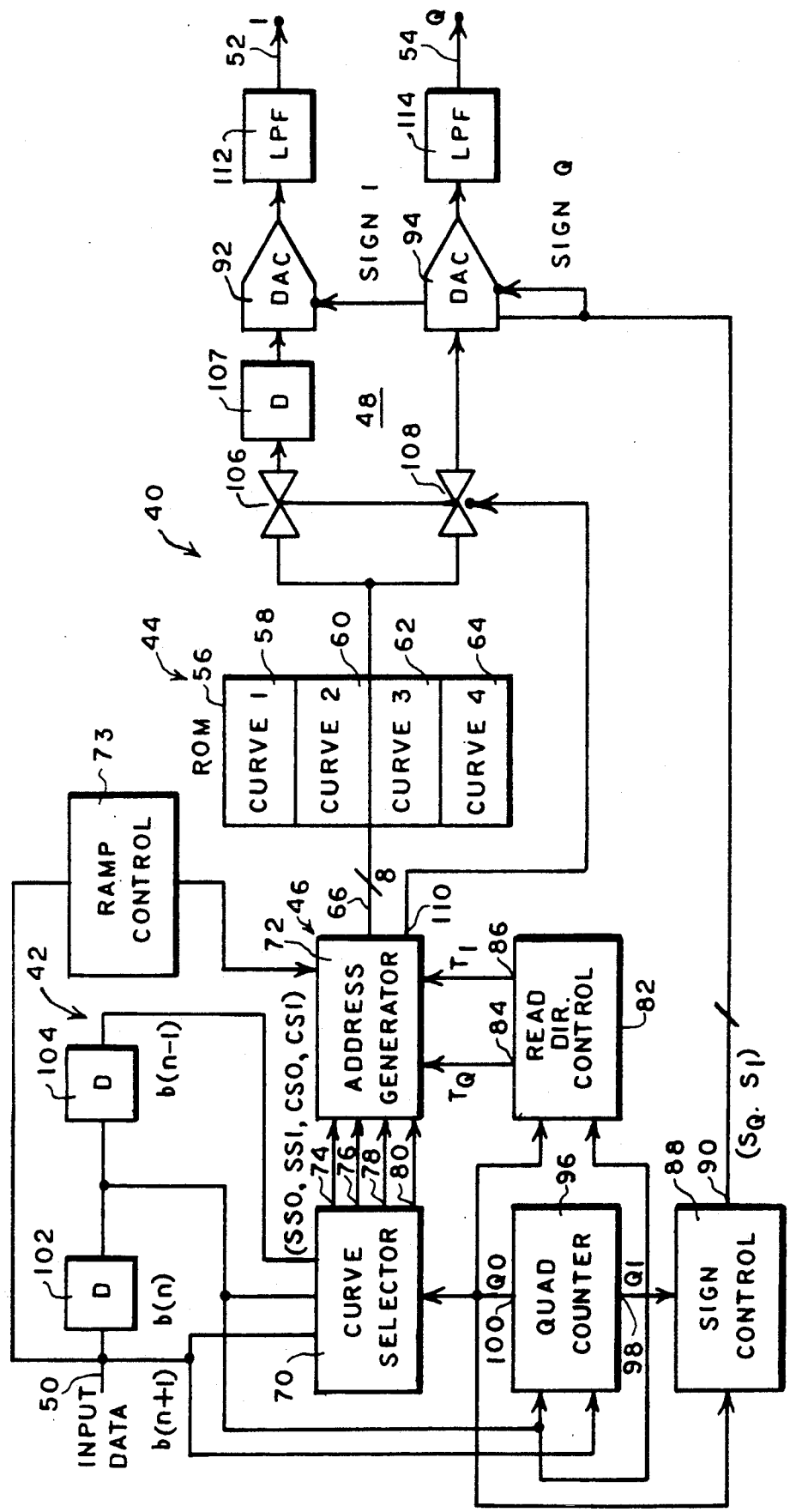
FIG. 2 is a block diagram of a system for generating I and Q baseband analog modulation signals responsive to serial bits of digital data structured in accordance with a preferred embodiment of the present invention.

Referring now to FIG. 2, it illustrates, in block diagram form, a system 40 embodying the present invention for producing I and Q baseband analog modulation signals in accordance with a preferred embodiment of the present invention. The system 40 generally includes an input means 42, a memory 44, an addressing means 46, and digital to analog conversion means 48. As will be seen hereinafter, the memory means 44 stores data or samples representing the waveform amplitudes of the I and Q modulation baseband analog signals. As will also be seen hereinafter, only four waveform segments or curves of the I and Q signals need be stored in the memory means 44. The number of samples stored in the memory means 44 for each waveform segment and the sampling rate of the memory means 44 results in each waveform segment stored in the memory means 44 corresponding in length to one bit period of the serial bits of digital data which are received by the input means 42 at a data input 50.

The addressing means 46, responsive to the serial bits of digital data received at input 50 addresses the appropriate waveform samples stored in memory means 44 during each bit period. The digital to analog conversion means 48 receives the data or samples stored in the memory locations of the memory means 44 addressed by the addressing means and converts the addressed digital I and Q samples to the I and Q baseband analog modulation signals which are provided at outputs 52 and 54.

As can be seen from the foregoing, the system 40 embodying the present invention directly synthesizes the I and Q baseband analog modulation signals and does not require the low-pass filter, integrator, multiplier, and sine and cosine ROMs required by the prior art.

The memory means 14 is preferably a read only memory (ROM) 56 which is partitioned into four memory portions, memory portions 58, 60, 62, and 64. Each memory portion stores the samples representing a respective given one of the I and Q waveform segments. To that end, memory portion 58 may store the samples representing the first waveform segment, memory portion 60 may store the samples representing the second waveform segment, memory portion 62 may store the samples representing the third waveform segment, and memory portion 64 may store the samples representing the fourth waveform segment. Preferably, each memory portion stores 64 samples of its respective waveform segment with each sample containing 6-bits. Since 256 memory locations are required in ROM 56, the ROM may be addressed by an 8-bit address provided by the addressing means 46 over an 8-bit address bus 66. As a result, each sample stored in the ROM 56 has its own unique address.

Figure 3:
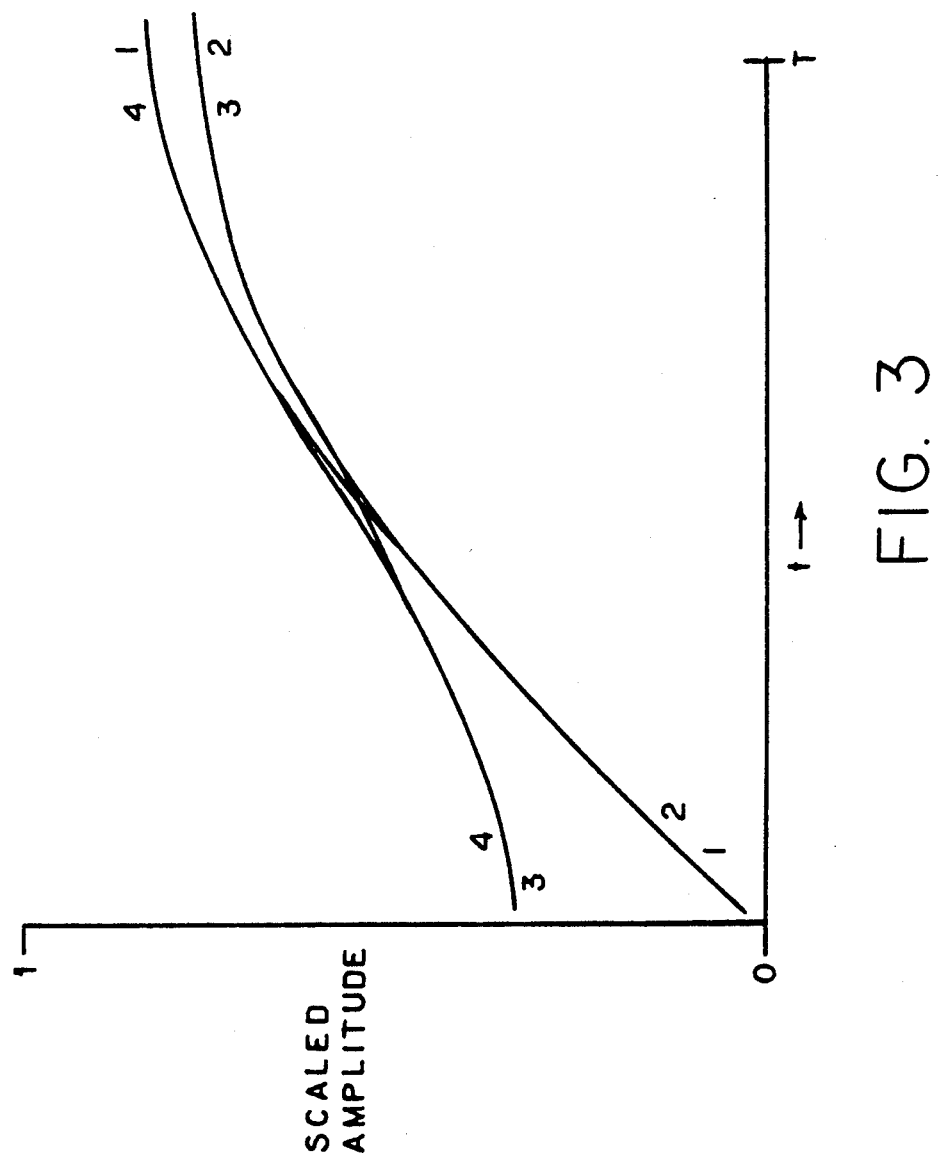
FIG. 3 is a set of curves illustrating the four waveform segments which may be utilized for generating the I and Q baseband analog modulation signals in accordance with the present invention.

Analog representations of the four waveform segments stored in ROM 56 are shown in FIG. 3. Each of the waveform segments has been scaled to have an amplitude between 0 and 1. Also, the waveform segments are illustrated as extending for 1 bit period T.

Referring again to FIG. 2, the addressing means 46 is caused to address the appropriate memory portion for the appropriate I signal waveform segment and Q signal waveform segment during each bit period by a waveform segment or curve selector 70. The addressing means 46 preferably is formed by an address generator 72 which addresses the memory locations of the appropriate memory portions in consecutive order. The curve selector 70 provides the address generator 72 during each bit period with a 2-bit representation (SS0, SS1) at outputs 74 and 76 to cause the address generator 72 to address the appropriate memory portion for the appropriate Q signal waveform segment and a 2-bit representation (CS0, CS1) at outputs 78 and 80 to cause the address generator 72 to address the appropriate memory portion for the appropriate I signal waveform segment.

The waveform segment selection signals SS0, SS1 and CS0, CS1 are 2-bit binary representations of the selected waveform segments starting with the binary representation of 0,0. As a result, the 2-bit binary representations of the selected waveform segments are 0,0 for waveform segment one, 0,1 for waveform segment two, 1,0 for waveform segment three, and 1,1 for waveform segment four.

To reduce the number of waveform segments which must be stored in ROM 56 to four waveform segments, the address generator 72 is also coupled to a read direction control 82. At the beginning of each new bit period, the read direction control provides a pair of control signals to the address generator 72 from its outputs 84 and 86 The read direction control signals provided at outputs 84 and 86 cause the address generator 72 to address the memory locations of the memory portions 58, 60, 62, or 64 in an ascending order (forward direction) or descending order (reverse direction). When the address generator 72 is to read a waveform segment for the Q signal in reverse direction, the read direction control 82 will provide a control signal ($T_Q$) having a logical 1 level at output 84. If the address generator is to read in the forward direction, the control signal $T_Q$ will be a logical 0. Similarly, if the address generator 72 is to read a waveform segment for the I signal in reverse order, the read direction control 82 will provide a control signal $T_I$ at output 86 which is a logical 1 level. If the address generator 72 is to read the wave form segment in the forward direction, the control $T_I$ will be a logical 0.

To also permit the need for storing only four waveform segments in ROM 56, the system 40 further includes an arithmetic sign control 88. Sign control 88 includes an output 90 which is coupled to the digital to analog conversion means 48. The sign control 88 through a pair of sign signals $S_Q$ for the Q signal and $S_I$ for the I signal causes the digital to analog conversion means 48 to sign invert its analog output during selected ones of the bit periods in a manner to be more fully described hereinafter.

The digital to analog conversion means 48 comprises a first digital to analog converter 92 and a second digital to analog converter 94. The first digital to analog converter 92 converts the digital samples of the waveform segments to analog form for the I signal and digital to analog converter 94 converts the digital samples of the waveform segments for the Q signal. The output 90 of sign control 88 is a 2-bit output providing the sign control signals $S_I$ and $S_Q$ to the digital to analog converters 92 and 94. Sign control signal $S_I$ is applied to digital to analog converter 92 and sign control signal $S_Q$ is applied to digital to analog converter 94. When the sign control signals are a logical 1, the digital to analog converters 92 and 94 sign invert the polarity of the analog signal.

As can thus be seen, a total of 16 waveform segments would normally be required for synthesizing the I and Q baseband analog modulation signals. However, due to the time reversal provided by the read direction control 82 and the sign inversion by sign control 88 only four waveform segments need be stored in the ROM 56.

The waveform segment selector 70, the read direction control 82, and the sign control 88 all require information, in accordance with this preferred embodiment, as to the geometric quadrant of the I and Q signals being produced. To that end, the system 40 further includes a quadrant determining means in the form of a quadrant counter 96. A specific implementation of the quadrant counter 96 will be described hereinafter. The quadrant counter 96 in accordance with this preferred embodiment is a modulo 4, 2-bit counter. The quadrant counter 96 provides a 2-bit representation (Q1,Q0) of the quadrant of the I and Q signals. The 2-bit quadrant representations provided by the quadrant counter 96 at its outputs 98 and 100 are:
0,0 for quadrant one ($0 \leq \Phi(t) \leq 90°$);
0,1 for quadrant two ($90° \leq \Phi(t) \leq 180°$);
1,0 for quadrant three ($180° \leq \Phi(t) \leq 270°$); and
1,1 or quadrant four ($270° \leq \Phi(t) \leq 360°$).

The waveform segment selector 70 in causing the address generator 72 to address the appropriate memory portion of read only memory 56 is responsive to the last three bits of the serial bits of digital data received at the input 50 and the least significant bit (Q0) from the quadrant counter 96. To provide the waveform segment select 70 with the last three bits of the serial bits of digital data, the input means 42 includes a first delay 102 and second delay 104. The delays 102, 104 are coupled in series as illustrated and delay the received binary data bits by one bit period T. As a result, the output of delay 104 provides binary bit $b(n-1)$, the output of delay 102 provides binary bit b(n) and the input 50 provides the last received binary bit b(n+1).

A specific implementation for the waveform selector 70 will be described subsequently. However, the logic performed by the waveform segment selector 70 may be summarized by the logic equations below.

of the I signal is inverted when the I signal falls within the second or third quadrant.

The following table results from the implementation of the logic equation given above in response to the last three bits of the serial bits of digital data.

| | Quadrant | | | | Q Signal | | | I Signal | | |
|---|---|---|---|---|---|---|---|---|---|---|
| b(n−1)b(n)b(n+1) | $Q_1$ | $Q_0$ | # | E | Waveform Segment | $S_Q$ | $T_Q$ | Waveform Segment | $S_I$ | $T_I$ |
| 000 | 0 | 0 | 1 | 0 | 1 | 0 | 1 | 1 | 0 | 0 |
|  | 0 | 1 | 2 | 1 | 1 | 0 | 0 | 1 | 1 | 1 |
|  | 1 | 0 | 3 | 0 | 1 | 1 | 1 | 1 | 1 | 0 |
|  | 1 | 1 | 4 | 1 | 1 | 1 | 0 | 1 | 0 | 1 |
| 001 | 0 | 0 | 1 | 0 | 4 | 0 | 1 | 2 | 0 | 0 |
|  | 0 | 1 | 2 | 1 | 2 | 0 | 0 | 4 | 1 | 1 |
|  | 1 | 0 | 3 | 0 | 4 | 1 | 1 | 2 | 1 | 0 |
|  | 1 | 1 | 4 | 1 | 2 | 1 | 0 | 4 | 0 | 1 |
| 010 | 0 | 0 | 1 | 1 | 3 | 0 | 0 | 3 | 0 | 1 |
|  | 0 | 1 | 2 | 0 | 3 | 0 | 1 | 3 | 1 | 0 |
|  | 1 | 0 | 3 | 1 | 3 | 1 | 0 | 3 | 1 | 1 |
|  | 1 | 1 | 4 | 0 | 3 | 1 | 1 | 3 | 0 | 0 |
| 011 | 0 | 0 | 1 | 1 | 4 | 0 | 0 | 2 | 0 | 1 |
|  | 0 | 1 | 2 | 0 | 2 | 0 | 1 | 4 | 1 | 0 |
|  | 1 | 0 | 3 | 1 | 4 | 1 | 0 | 2 | 1 | 1 |
|  | 1 | 1 | 4 | 0 | 2 | 1 | 1 | 4 | 0 | 0 |
| 100 | 0 | 0 | 1 | 0 | 2 | 0 | 1 | 4 | 0 | 0 |
|  | 0 | 1 | 2 | 1 | 4 | 0 | 0 | 2 | 1 | 1 |
|  | 1 | 0 | 3 | 0 | 2 | 1 | 1 | 4 | 1 | 0 |
|  | 1 | 1 | 4 | 1 | 4 | 1 | 0 | 2 | 0 | 1 |
| 101 | 0 | 0 | 1 | 0 | 3 | 0 | 1 | 3 | 0 | 0 |
|  | 0 | 1 | 2 | 1 | 3 | 0 | 0 | 3 | 1 | 1 |
|  | 1 | 0 | 3 | 0 | 3 | 1 | 1 | 3 | 1 | 0 |
|  | 1 | 1 | 4 | 1 | 3 | 1 | 0 | 3 | 0 | 1 |
| 110 | 0 | 0 | 1 | 1 | 2 | 0 | 0 | 4 | 0 | 1 |
|  | 0 | 1 | 2 | 0 | 4 | 0 | 1 | 2 | 1 | 0 |
|  | 1 | 0 | 3 | 1 | 2 | 1 | 0 | 4 | 1 | 1 |
|  | 1 | 1 | 4 | 0 | 4 | 1 | 1 | 2 | 0 | 0 |
| 111 | 0 | 0 | 1 | 1 | 1 | 0 | 0 | 1 | 0 | 1 |
|  | 0 | 1 | 2 | 0 | 1 | 0 | 1 | 1 | 1 | 0 |
|  | 1 | 0 | 3 | 1 | 1 | 1 | 0 | 1 | 1 | 1 |
|  | 1 | 1 | 4 | 0 | 1 | 1 | 1 | 1 | 0 | 0 |

$SS0 = CS0 = b(n-1) XOR\ b(n+1)$ $SS1 = E[b(n) XOR\ b(n-1)] + E^* [b(n+1) XOR\ b(n)]$ $CS1 = E^*[b(n) XOR\ b(n-1)] + E\ [b(n+1) XOR\ b(n)]$ $E = Q_0 XOR\ b(n)$

The logic performed by the read direction control 82 may be summarized by the logic equations below.

$E = Q_0 XOR\ b(n)$ $T_Q = E^*$ $T_I = E$

A specific implementation of the sign control 88 in accordance with this preferred embodiment will be described subsequently. However, the logic functions provided by the sign control 88 are summarized below in the following logic equations.

$S_Q = Q_1$ $S_I = Q_0 XOR\ Q_1$

As can be noted from the logic equations above, the arithmetic sign of the Q signal is inverted when the Q signal falls within the third or fourth quadrant. The sign In making reference to the above table, let us assume that the last three bits of digital data received by system 40 are zero for b(n−1), zero for b(n), and one for b(n+1) and that the quadrant of the I signal is the second quadrant. It will be seen that the waveform segment select 70 will cause the address generator 72 to address the digital samples of the second memory portion 60 which stores the 64 digital samples representing the amplitude of the second waveform segment for the Q signal. It may also be seen that digital to analog converter 94 does not invert the polarity of the second waveform segment and that the address generator addresses the memory locations of the second memory portion 60 in ascending or the forward direction. With respect to the I signal, it may be seen that the waveform segment select 70 causes the address generator 72 to address the fourth memory portion 64 of the read only memory 56 which stores the 64 samples representing the amplitude of the fourth waveform segment. It may also be seen that the digital to analog converter 92 inverts the polarity of the fourth waveform segment and that the address generator 72 addresses the memory locations of the fourth memory portion 64 in descending order or in the reverse direction.

The 64 samples of the second memory portion 60 and the 64 samples of the fourth memory portion 64 are all addressed within the current bit period. The address generator 72 preferably addresses the memory locations for the I and Q signals during alternate accesses and as a result, in accordance with this example, addresses the memory locations of the second and fourth memory portions 60 and 64 during alternate accesses. The digital samples for the I signal are provided to the digital to analog converter 92 through a first transfer gate 106 and a delay 107. The digital samples for the Q signal are provided to the digital to analog converter 94 through a second transfer gate 108. The first and second transfer gates 106 and 108 are controlled by the address generator from an output 110. The delay 107 is provided to delay the I signal digital sample by one access cycle so that the digital samples for the I and Q signals are received by the digital to analog converters 92 and 94 in proper alignment.

The resulting I and Q waveforms are filtered by first and second low-pass filters 112 and 114 respectively after the digital to analog conversion by the digital to analog converters 92 and 94 respectively. As a result, the I and Q baseband analog modulation signals are provided at the outputs 52 and 54. The I and Q waveforms may then be mixed in a known manner to obtain the final modulated signal. In accordance with this preferred embodiment, the data rate of the serial bits of digital data is 72 kilohertz resulting in bit periods of 72,000 seconds. During each bit period, 128 memory locations of the read only memory 56 are addressed by the address generator 72, 64 memory locations for the I signal, and 64 memory locations for the Q signal.

Figure 4:
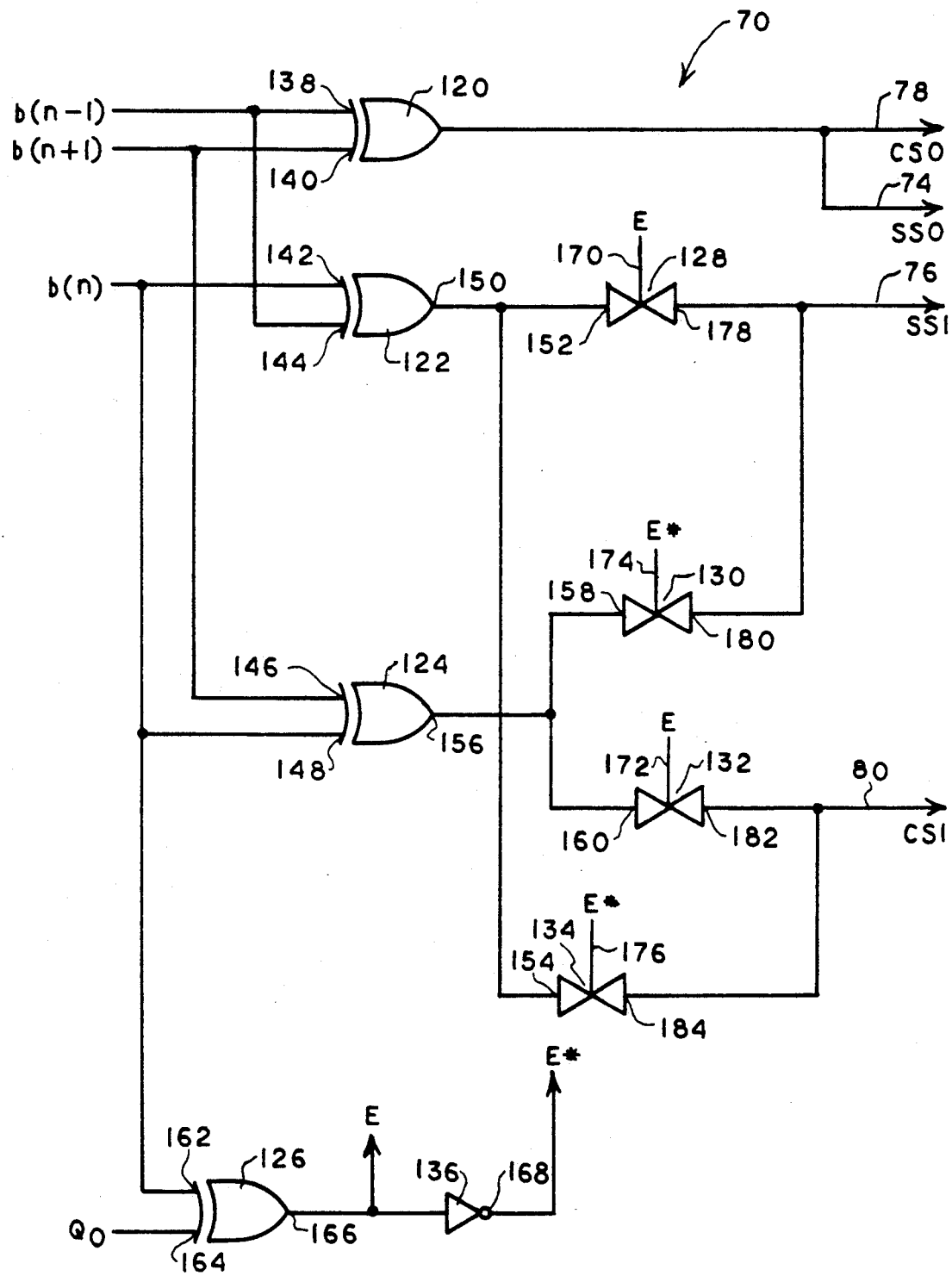
FIG. 4 is a detailed schematic circuit diagram of the curve select of FIG. 2

Referring now to FIG. 4, it illustrates in schematic circuit diagram form, the waveform segment selector 70 of system 40 illustrated in FIG. 2 for implementing the logic functions previously given with respect to the waveform segment selector 70. The waveform segment selector 70 generally includes exclusive OR gates 120, 122, 124, and 126, transfer gates 128, 130, 132, and 134 and an inverter 136. Transfer gates 128, 130, 132, and 134 are preferably CMOS transfer gates of the type well known in the art.

Exclusive OR gate 120 generates the least significant bits CS0 and SS0 of the 2-bit waveform select signals. To that end, exclusive OR gate 120 includes a first input 138 for receiving the $b(n-1)$ bit of the serial bit stream and an input 140 for receiving $b(n+1)$ bit of the serial bit stream. As will be noted in the figure, the least significant bit of the waveform segment select signals for both the I and the Q signals have the same values but are broken out so as to be consistent with FIG. 2. Hence, CS0 is provided at output 78 and SS0 is provided at output 74.

Exclusive OR gate 122 includes a first input 142 for receiving the $b(n)$ bit and a second input 144 for receiving the $b(n-1)$ bit. Exclusive OR gate 124 includes a first input 146 for receiving the $b(n+1)$ bit and a second input 148 for receiving the $b(n)$ bit. Exclusive OR gate 122 has an output 150 which is coupled to an input 152 of transfer gate 128 and to an input 154 of transfer gate 134. Exclusive OR gate 124 includes an output 156 which is coupled to an input 158 of transfer gate 130 and to an input 160 of transfer gate 132.

To generate the enable control signal E, exclusive OR gate 126 has a first input 162 for receiving the $b(n)$ bit and a second input 164 for receiving the least significant bit (Q0) of the 2-bit representation of the quadrant. Exclusive OR gate 126 has an output 166 for providing the value of the enable control signal E. The inverter 136 is coupled to the output 166 of exclusive OR gate 126 and provides an output 168 the complement of the enable control signal (E*).

The enable control signal E is applied to the control input 170 of transfer gate 128 and the control input 172 of transfer gate 132. The complement of the enable control signal E* is applied to the control input 174 of transfer gate 130 and the control input 176 of the transfer gate 134.

The most significant bit SS1 is provided to output 76 from the outputs 178 and 180 of transfer gates 128 and 130 respectively. The most significant bit CS1 is provided at output 80 from the outputs 182 and 184 of transfer gates 132 and 134 respectively.

Figure 5:
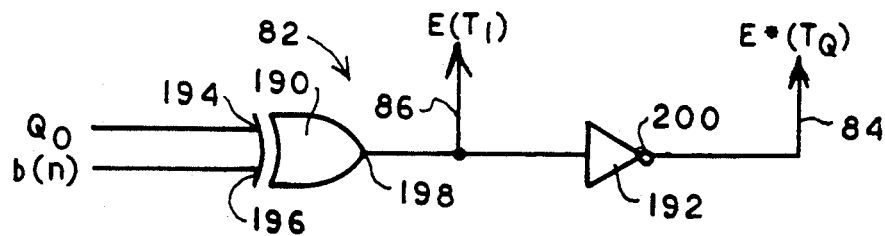
FIG. 5 is a detailed schematic circuit diagram of the read direction control of the system of FIG. 2.

Referring now to FIG. 5, it illustrates, in schematic circuit diagram form, the read direction control 82. The read direction control 82 includes exclusive OR gate 190 and an inverter 192. Exclusive OR gate 190 has a first input 194 for receiving the least significant bit of the quadrant Q0 and a second input 196 for receiving bit $b(n)$ of the serial bits of data. The output 198 of exclusive OR gate 190 provides the read direction control signal for the I signal $T_I$ and it can also be seen that this signal is also equal to the enable control signal E. The output 200 of inverter 192 provides the value of the read direction control signal for the Q signal $T_Q$. It will also be noted that $T_Q$ is equal to the complement of the enable control signal or E*.

Although a separate read direction control 82 is illustrated in FIG. 2 and in detail in FIG. 5, it will be appreciated by those skilled in the art that in implementing the present invention, the separate read direction control may be omitted since the $E(T_I)$ and $E*(T_Q)$ signals are generated in the curve selector 70 of FIG. 4. Hence, the read direction control may be incorporated within the curve selector 70 to avoid duplication of hardware. The separate read direction control has been illustrated only for purposes of lending better understanding of the present invention.

As will be noted in the table, the value of E changes during alternating bit periods. As a result, the read direction control 82 causes the address generator 72 to address the memory portions of the read only memory 56 in reverse order during alternating ones of the bit periods for both the I signal and the Q signal. When the address generator 72 addresses the memory locations for the I signal in the forward direction, the address generator will also be addressing the memory locations for the Q signal in the reverse direction and vice versa. Also, as will be seen hereinafter, the system may be initialized so that during the first bit period of operation the addressing means addresses the memory locations in reverse order for the I signal. As a result, the addressing means will address the memory locations in reverse order for the I signal during odd numbered bit periods and for the Q signal during even numbered bit periods.

Figure 6:
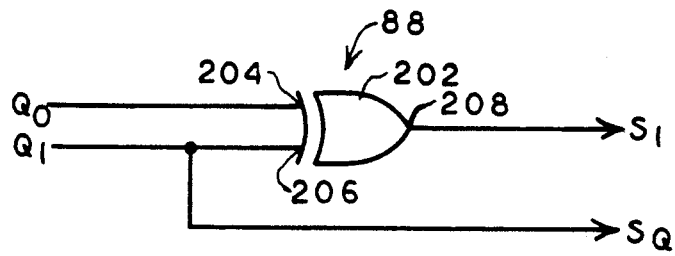
FIG. 6 is a detailed schematic circuit diagram of the sign control of the system of FIG. 2.

Referring now to FIG. 6, it illustrates, in schematic circuit diagram form, the sign control 88. The sign control 88 includes an exclusive OR gate 202. The exclusive OR gate 202 includes a first input 204 for receiving the least significant quadrant bit Q0 and a second input 206 for receiving the most significant quadrant bit Q1. The output 208 of exclusive OR gate 202 provides the sign signal for the I signal and since the sign signal for the Q signal is equal to Q1, the input 206 of exclusive OR gate 202 provides the value of $S_Q$ directly.

Figure 7:
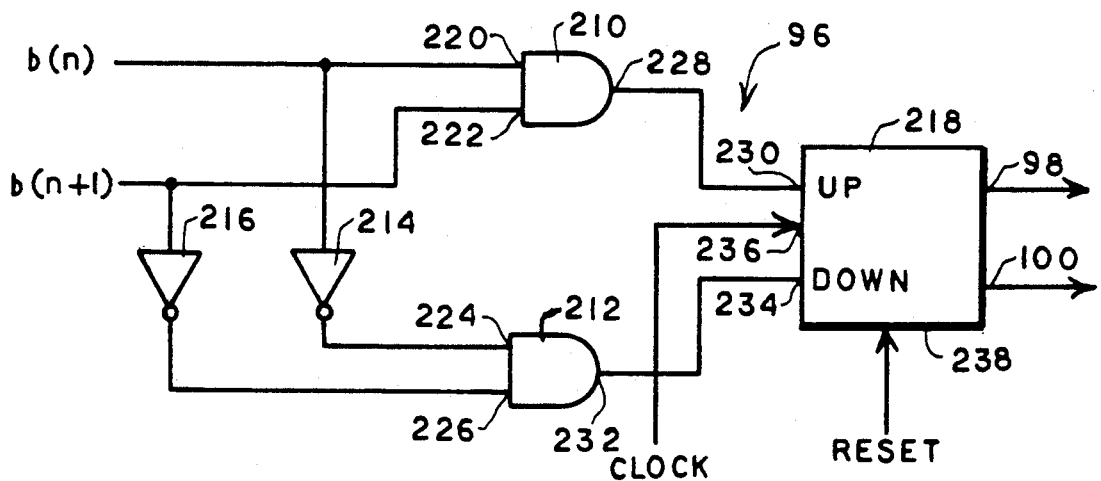
FIG. 7 is a detailed schematic circuit diagram of the quadrant counter of the system of FIG. 2.

Referring now to FIG. 7, it illustrates, in schematic circuit diagram form, the quadrant counter 96. The quadrant counter 96, as previously mentioned, comprises a modulo 4, 2-bit counter comprising AND gates 210 and 212, inverters 214 and 216, and a counter 218. The counter has output 98 and 100 for providing the most significant bit and least significant bit of the quadrant.

AND gate 210 includes a first input 220 for receiving the b(n) bit and a second input 222 for receiving the b(n+1) bit of the serial bits of data. Input 220 of AND gate 210 is coupled to the input of inverter 214 and the input 222 of AND gate 210 is coupled to the input of inverter 216. The outputs of inverters 214 and 216 are coupled to inputs 224 and 226 of AND gate 212. The output 228 of AND gate 210 is coupled to the 'up' input 230 of counter 218. The output 232 of AND gate 212 is coupled to the 'down' input 234 of counter 218.

Counter 218 also includes a clock input 236 to be coupled to a system clock which provides clock timing pulses at a rate corresponding to the data rate of the incoming serial bits of data. The counter 218 also includes a reset input 238 for resetting outputs 98 and 100 to some initial state when the system is initialized at t=0.

The initial value of the quadrant counter is chosen as follows. When the first bit to be transmitted arrives, it is assumed to be b(n), and b(n−1) is forced to be equal to it. The waveform for this b(n) will be produced in the next bit interval, as soon as b(n+1) arrives. The present bit interval is used for start up, as will be explained later. The quadrant counter is initialized to (1,1) (quadrant 4) if b(n)=0, and to (0,0) (quadrant 1) if b(n)=1. When the next bit b(n+1) arrives, the curves corresponding to b(n) are generated. The following cases exist:

| [This is forced equal to b(n)] | [This is the first bit] | | Quadrant | Waveform Segment | | Sign | | Reverse | |
|---|---|---|---|---|---|---|---|---|---|
| b(n−1) | b(n) | b(n+1) | $Q_1 Q_0$ | I | Q | $S_I$ | $S_Q$ | $T_I$ | $T_Q$ |
| 0 | 0 | 0 | 4 (1,1) | 1 | 1 | 0 | 1 | 1 | 0 |
| 0 | 0 | 1 | 4 (1,1) | 4 | 2 | 0 | 1 | 1 | 0 |
| 1 | 1 | 0 | 1 (0,0) | 4 | 2 | 0 | 0 | 1 | 0 |
| 1 | 1 | 1 | 1 (0,0) | 1 | 1 | 0 | 0 | 1 | 0 |

With this initialization for the I signal, waveform segment 1 or 4 is read backwards and with positive sign, i.e., it always starts at +1. For the Q signal, waveform segment 1 or 2 is read forwards, with + or − sign, i.e., it always starts at 0.

$Q_1$ and $Q_0$ provide the quadrant number corresponding to the symbol interval for bit b(n). At the end of that interval, the clock allows the counter to change to the new quadrant number which is the one corresponding to the symbol interval (T) for b(n+1). Hence, there is a one symbol delay, since b(n+1) must be known before the output corresponding to b(n) is generated. With counter 218 being reset upon initialization of the system, it will be seen that the address generator 72 will be caused to address the memory locations in reverse order for the I signal during odd numbered bit periods and for the Q signal during even numbered bit periods.

As an alternative embodiment, it is possible to perform all of the necessary logic functions for generating the I and Q baseband analog modulation signals without the need of the quadrant counter 96 illustrated in FIG. 2. In accordance with such an alternative embodiment, the value of the enable control signal E can be obtained from a toggle flip-flop that changes state at every bit period since in the embodiment of FIG. 2 the value of the enable control signal E does indeed change state during alternate bit periods. The toggle flip-flop may be initialized to either zero or one and if initialized to a logical 1 the address generator will address the memory locations in reverse order for the I signal during odd numbered bit periods and for the Q signal during even numbered bit periods.

The read direction control signals may be generated directly from the enable control signal E provided by the toggle flip-flop. The read direction control signal $T_I$ can be obtained directly from the output of the toggle flip-flop. The read direction control signal $T_Q$ can be derived through an inverter coupled to the output of the toggle flip-flop.

The sign control signals can be generated by using a toggle flip-flop with its clock inhibited by b(n) XOR b(n+1). Two such circuits would be needed however, one for the I signal and one for Q signal. This is required since for the cosine, the sign change is ahead of that of the sine by one bit period.

As can be seen from the foregoing, the present invention may be implemented without a quadrant counter. However, both embodiments would have about the same complexity.

Figure 8:
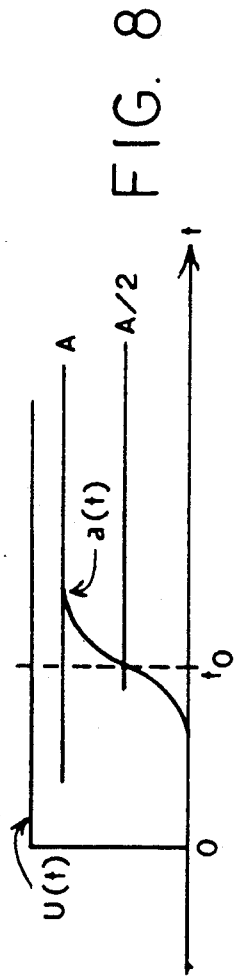
FIG. 8 illustrates the step response a(t) of a linear filter in response to a unit step u(t)

Linear phase filters have important properties which are utilized to advantage in accordance with the preferred embodiment of the present invention to permit the I and Q baseband analog modulation waveforms to be synthesized from only the four stored waveform segments. One such property is that the impulse response h(t) of a linear phase filter is symmetric around its midpoint. In other words, if the impulse response has a delay t0 at which point the impulse response is at a maximum, then the impulse response will be equal at t0+t and t0−t. As illustrated in FIG. 8, the step response a(t) of a linear phase filter also possesses symmetry. If the initial and final values of the step response are 0 and A respectively, and if t0 is the time at which the step response is equal to A/2, then a(t0+t)=A−a(t0−t).

Figure 9:
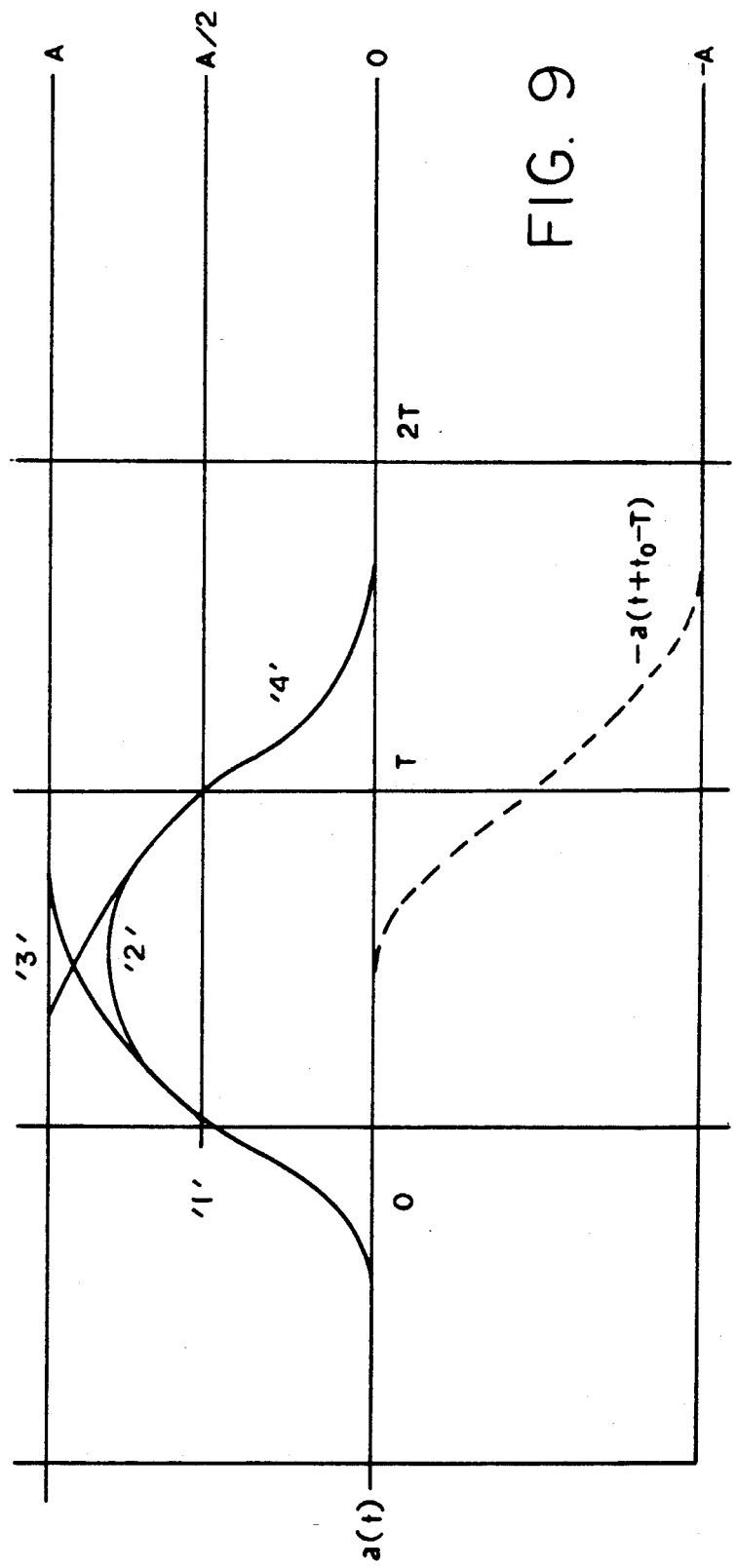
FIG. 9 illustrates a series of curves showing the step response a(t) of a linear filter over two bit periods.

If the filter has a step response that goes from 0 to A in less than 2 bit periods (2T), the response to a pulse having a width T will last for less than 3 bit periods (3T), and, because of symmetry of the step response, will be equal to A/2 at the two inner bit boundaries 0 and T (adjusted for the filter delay time). This is illustrated in FIG. 9. This will guarantee that g(t), the filtered response to p(t), always goes through 0, A/2 or A at the bit boundaries.

Figure 10:
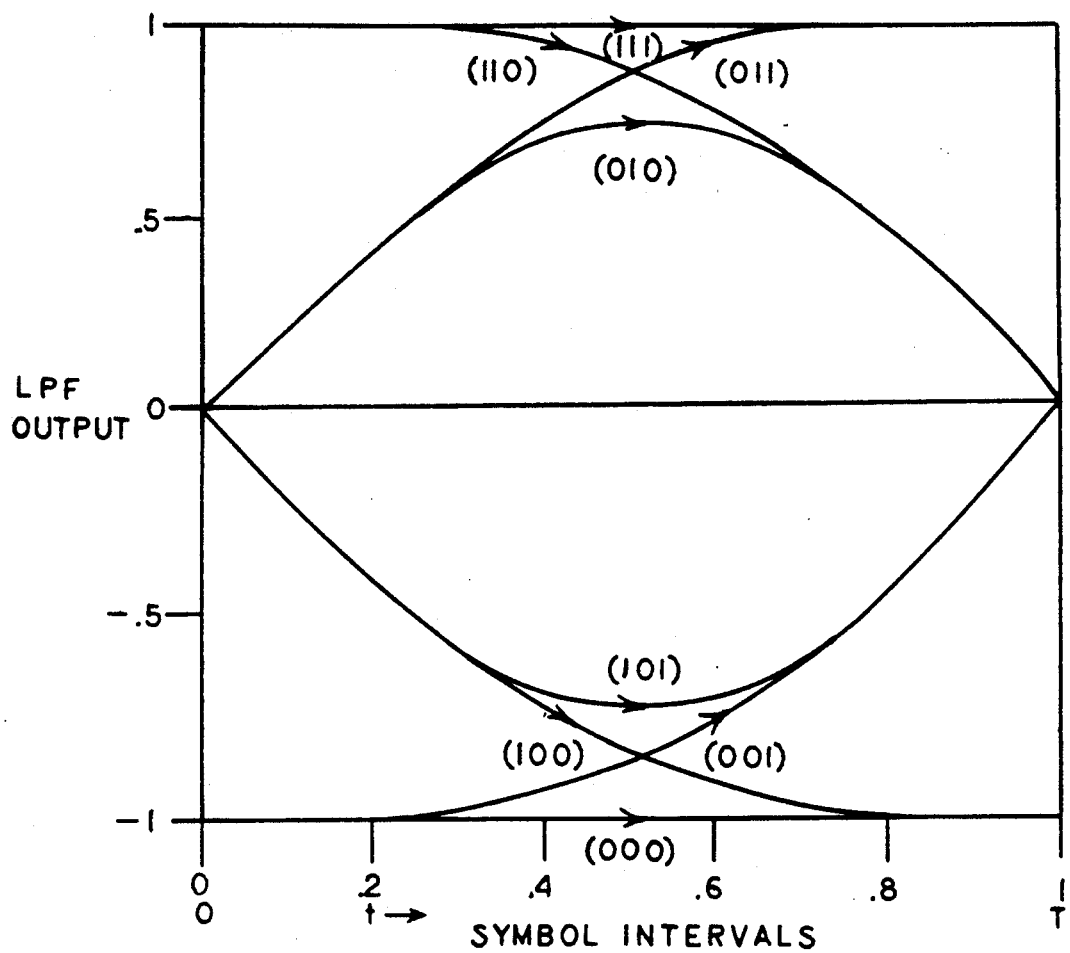
FIG. 10 is an eye diagram illustrating the output of a low-pass filter versus time for one bit period responsive to eight different combinations of three consecutively received bits of digital data.

Between these two sets of three values there are eight possible frequency trajectories. FIG. 10 illustrates an eye diagram, of the type well known in the art, illustrating the eight possible trajectories. These trajectories are designated as $g(t)$, i=0,1,...,7, where i corresponds to the numerical equivalent of the bit triplet that defines the trajectory. For example, $g_5(t)$ corresponds to trajectory 101. Two trajectories, 111 and 000, correspond to no change. Two other trajectories, 010 and 101, correspond to the response to a pulse of width T, and the remaining four trajectories are part of the response to any pulse or step. Because the instantaneous frequency f(t) of the modulated signal has to be proportional to the filter response g(t), there exists a set of eight "frequency trajectories" which may be designated as $f_i(t)$, i=0,1,..., 7, which may be numbered in the same manner with i corresponding to the numerical equivalent of the bit triplet that defines the frequency trajectory. The eight frequency trajectories may be obtained from the corresponding eight trajectories $g_i(t)$ by scaling them to the modulating frequency ($f_m$). As will be noted from FIG. 10, the filter response g(t) is normalized to + and −1.

Another important property of linear phase filters relates to the areas of different portions of the frequency trajectories. Since the phase is the integral of the frequency, the area under a given frequency trajectory in the eye diagram of FIG. 10 (with the appropriate sign) represents the phase change during a one bit interval.

Referring again to FIG. 9, the following can be said for the filter step response between 0 and T for each of the curves designated '1', '2', '3', and '4': curve '1' is the response to unit step u(t),=a(t+t0) (adjusted for the filter delay t0); curve '2' is the pulse response=a(t+t0)−a(t+t0−T); curve '3' is A (constant); and curve '4' is the response to u(−t+T)=a(−t+T+t0)=a([T−t]+t0)=A−a(t0+[t−T]) (by symmetry).

The differences between '3' and '4' and between '1' and '2' are:

'3'−'4'=a(t0+[t−T]); and

'1'−'2'=a(t+t0−T)=a(t0+[t−T]).

Figure 11:
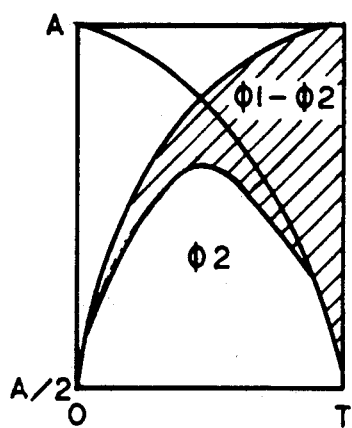
FIG. 11 shows a series of curves which may be utilized for visualizing the manner of calculating the phase difference between a pair of frequency trajectories.
Figure 12:
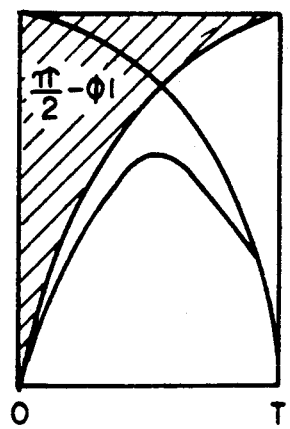
FIG. 12 is similar to FIG. 11 and illustrates the manner in which a further phase difference may be calculated.

If we denote the area under '1' by $\Phi 1$ and the area under '2' by $\Phi 2$ and recall that the area under '3' is $\pi/2$, it has been shown that $\Phi 1 - \Phi 2 = \pi/2 - \Phi 1$. $\Phi 1 - \Phi 2$ is illustrated in FIG. 11 and $\pi/2 - \Phi 1$ is illustrated in FIG. 12 to lend a clearer understanding of the foregoing.

It is now possible to examine the behavior of the phase as the bit pattern changes. If we consider three consecutive bits b(n−1), b(n) and b(n+1), these bits specify one of the frequency trajectories fi(t) in FIG. 10. The phase $\Phi(t)$ is the integral of f(t), and within a bit interval T can also follow eight possible phase trajectories $\Phi_i(t)$, i=0,1, ..., 7, which are the integral of the $f_i(t)$. We can write:

$$\Phi(t) = \Phi(nT) + \int f_i(t) = \Phi_i(t) \text{ for } nT < = t < = (n+1)T$$

The subscript 'i' stresses the fact that the shape of the phase path depends on the frequency trajectory $f_i(t)$. The initial condition $\Phi(nT)$ represents only a shift.

Because of different possible initial conditions, $\Phi(nT)$, these trajectories will be displaced by different constant amounts. The possible initial conditions are determined by the possible phase changes during one bit interval, which are the areas under the frequency trajectory curves, and which are limited to $+/-\pi/2$, $+/-\Phi 1$ and $+/-\Phi 2$ (because of symmetry two pairs of curves produce the same phase change). Successive phase changes are restricted by the way the data can change. For example, successive increments of $\pi/2$ are possible for a series of 1's, which produce a series of (111) paths, but successive increments of $\Phi 2$, for example, are not possible because the 010 path has to be followed by 100 or 101.

Figure 13:
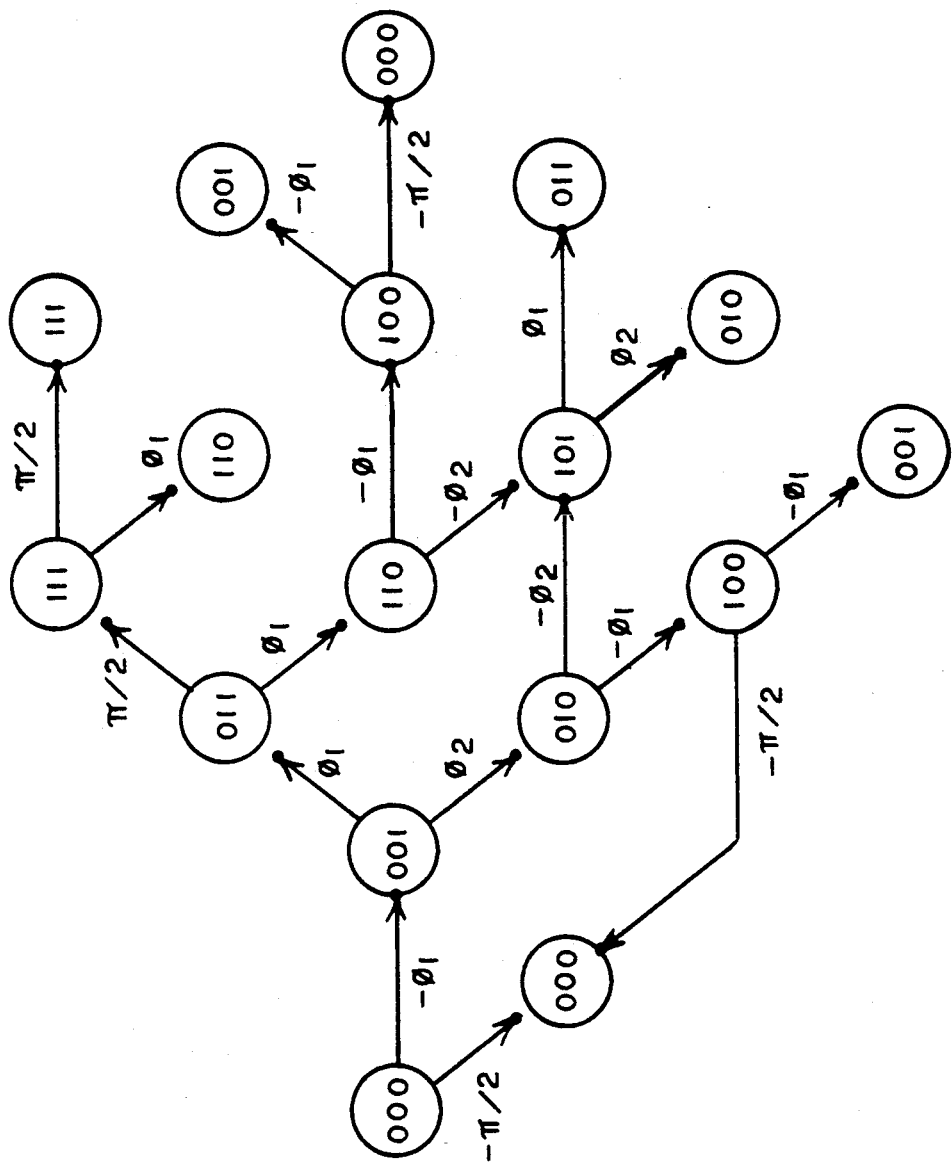
FIG. 13 is a tree diagram illustrating the possible phase transitions which result from changes in 3-bit patterns.

FIG. 13 contains a tree diagram showing the possible trajectories and the phase changes associated with them. The circles represent the bit triplets associated with the frequency trajectories. The value on the arrow leading to the triplet represents the phase change when the bit interval is traversed along the corresponding frequency trajectory. The tree stops when a triplet has been accounted for elsewhere in the diagram. For example, starting with an initial value of 0 for the phase, we may start with (000) to get a phase change of $-\pi/2$. From there, we can take either (000) again or (001), which give a final phase of $-\pi$ or $-\pi/2-\Phi 1$. The possible phase values at the bit boundaries are finite in number. They are $\Phi(nT) = 0, +/-\pi, (+/-\pi/2 +/- \Phi 1)$ n=even; and $\Phi(nT) = +/-\pi/2, +/-\Phi 1, +/-(\pi-\Phi 1)$ n=odd.

Figure 14:
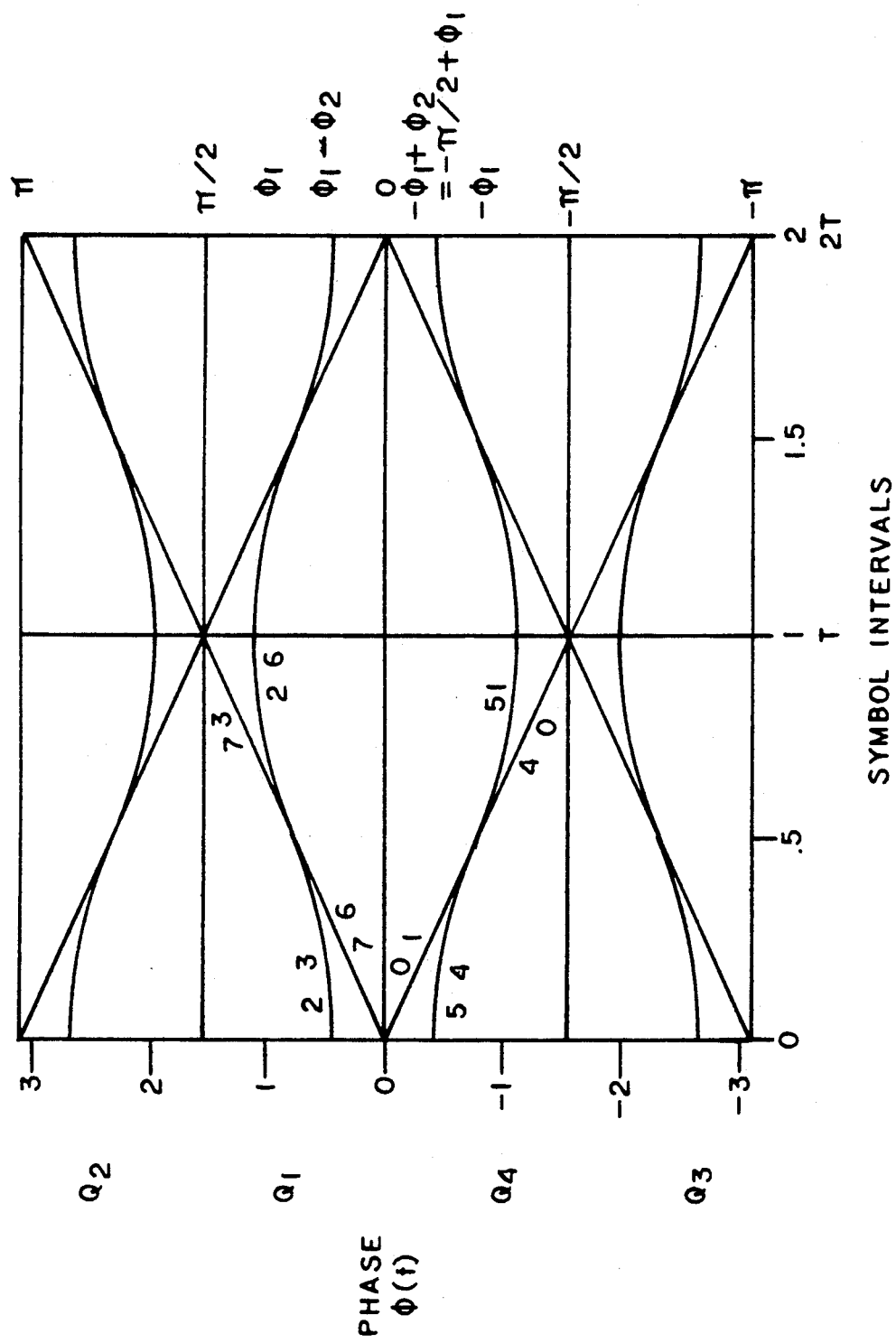
FIG. 14 is an eye diagram illustrating the phase changes over two bit periods resulting from the eye diagram of FIG. 10.

FIG. 14 shows an eye diagram of the phase, mapping it back to 0 in time every two bit intervals, and wrapping its value back into the interval $(-\pi,\pi)$, which can be done because sine and cosine are periodic, with period $2\pi$. The phase trajectories are numbered as indicated above.

Paths 0, 2, 5, and 7 have odd symmetry with respect to the middle of the bit interval, since they correspond to integrating the frequency trajectories 0 (000), 2 (010), 5 (101), and 7 (111) in FIG. 10, which are evenly symmetric with respect to the same point. It can also be noticed that the whole phase eye diagram can be constructed with only four basic paths, by sign inversion and/or time reversal.

Figure 15:
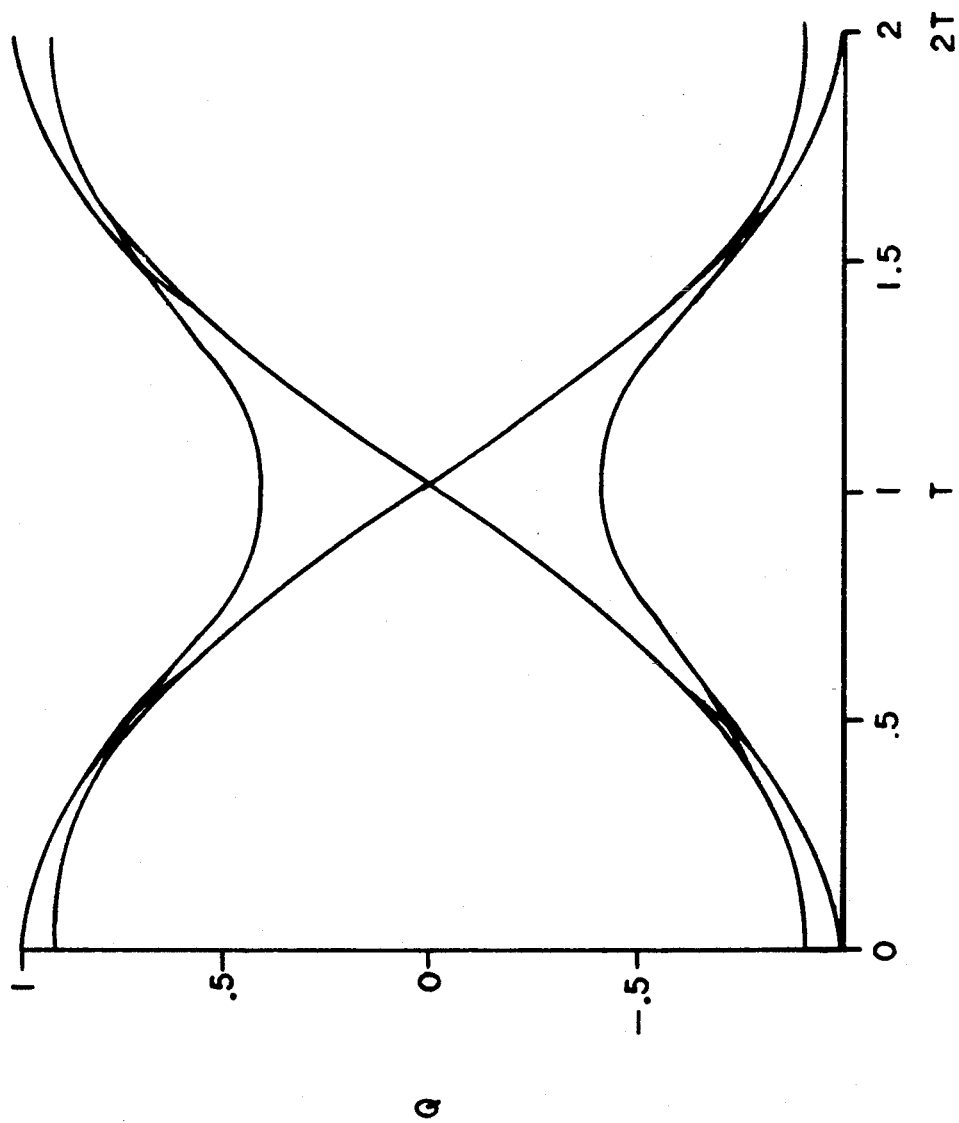
FIG. 15 illustrates the eight possible sine curve over a two bit period for the Q signal.
Figure 16:
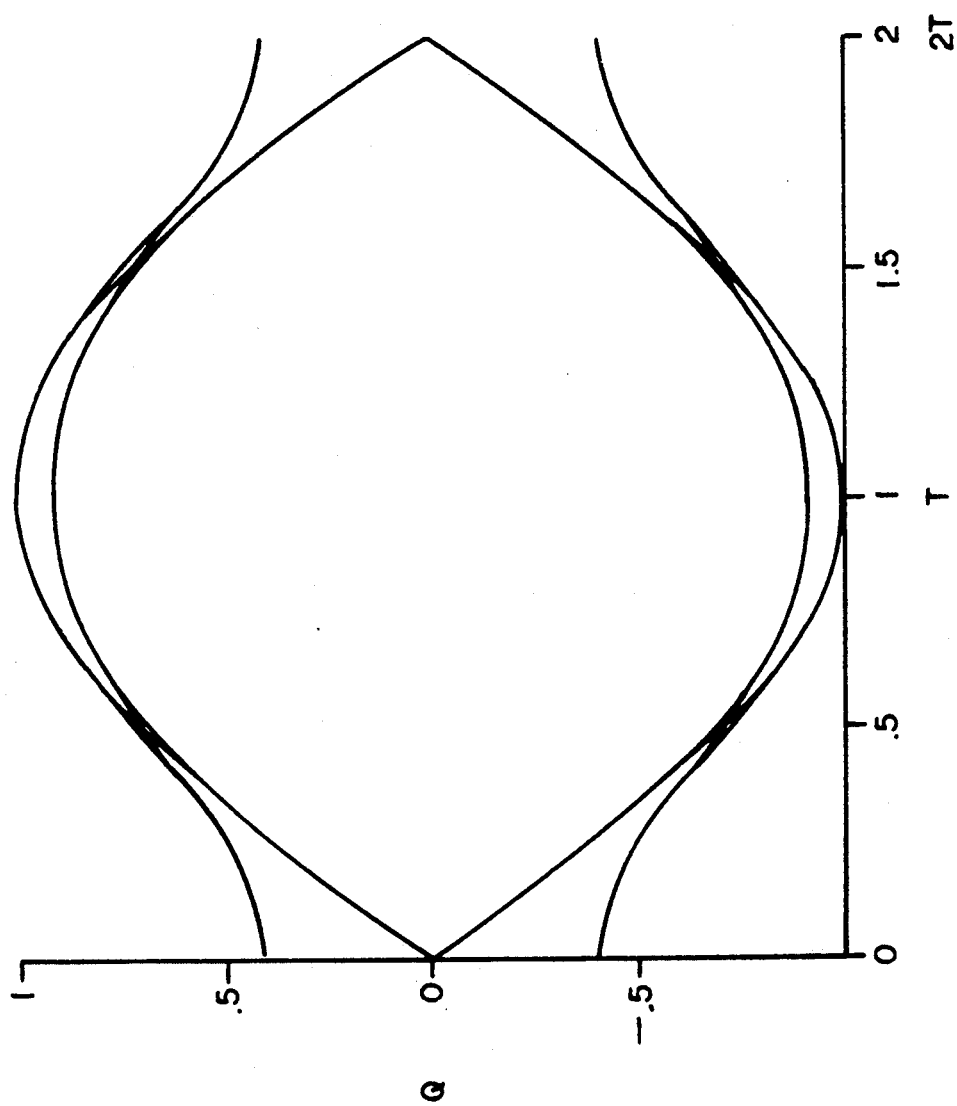
FIG. 16 illustrates the eight possible cosine curves over a two bit period for the I signal.

To generate the I and Q signals, the cosine and sine of the continuously varying phase function are required. Since it is composed of a finite number of segments, it is possible to map these segments according to sine and cosine functions, and synthesize the I and Q waveforms using those mapped segments. FIGS. 15 and 16 show eye diagrams of the Q and I waveform respectively as a result of such mapping.

Since a given phase path $\Phi_i(t)$ can lie in any one of the four quadrants because it has different possible initial conditions as can be seen from FIG. 14, its mapped counterpart could in general be different for each quadrant. The existing symmetries, however, reduce the number of segments to only four.

Mathematically, we can compute sin $\Phi_i(t)$ and cos $\Phi_i(t)$ for i=2, 3, 6 and 7, for example which are the segments in the first quadrant in the first symbol interval between 0 and T illustrated in FIG. 14. Then, all the other segments in the first symbol interval and all odd numbered symbol intervals are obtained by either inverting the argument and/or adding + or $-\pi$ to it. All these operations require only sign changes.

For the segments in the second symbol interval (between T and 2T), and all even numbered symbol intervals, the argument shifts by $+/-\pi/2$ and is inverted in some cases. This involves exchanging sine and cosine and/or changing the sign. Symmetries in the four basic phase paths reduce the number sine/cosine segments to a total of four. Hence, to generate the I and Q analog baseband modulation signals, these signals may be generated from the waveform segments 1, 2, 3, and 4 illustrated in FIG. 3 by changing the sign and using time-reversal.

As previously mentioned, the samples stored in ROM 44 for each of the waveform segments correspond in length to one bit period. However, less memory space would be required if the stored samples represent a portion of a waveform segment. This is possible since, for a range of values of the cutoff frequency of the Gaussian filter, the first half of waveform segments 1 and 2 and waveform segments 3 and 4 follow nearly identical paths, and the second half of waveform segments 1 and 4 and waveform segments 2 and follow nearly identical paths. Sixty-four samples would still be read during each bit period for each of the I and Q signals. For example, to read waveform segment 1 during a bit period, 32 samples of first half of waveform segments 1 or 2 could be read and thereafter, 32 samples of the second half of waveform segments 1 or 4 could be read.

Also as previously explained, when a transmission begins, the first data bit is taken as b(n) and bit b(n−1) is made equal to it. The quadrant counter is initialized to 1,1 (quadrant 4) if b(n)=0 or 0,0 (quadrant 1) if b(n)=1. Since the modulated signal $y(t) = I(t) \cos(2\pi f_c t) - Q(t) \sin(2\pi f_c t)$, just before the transmission, y(t) will be equal to zero. However, at the very start of the transmission, y(t) will be equal to its maximum envelope value of +1 or −1. This would cause the maximum frequency deviation to suddenly occur and in turn create spectrum splash with the result of causing interference to adjacent channels.

To avoid this problem, the system of FIG. 2 includes a ramp control 73 which is coupled to the input 50 and to the address generator 72. The ramp control, before the first real bit period of a transmission, causes a start-up bit period to be inserted which forces the modulated signal envelope to begin at zero and gradually increase to a value +1 or decrease to a value of −1. A similar problem is avoided at the end of a transmission wherein an end-of-transmission bit period is inserted by the ramp control 73 after the last real bit period which forces the modulated signal envelope during the end-of-transmission bit period to gradually decrease from +1 to 0 or gradually increase from −1 to 0. This is accomplished in the following manner.

In response to sensing the first serial pulse at input 50, the ramp control 73 immediately causes the address generator 72 to address memory portion 58 for reading waveform segment 1 for the I signal and to not address any of the memory portions for the Q signal during the start-up bit period. As a result, during the start-up bit period, the Q signal will be zero and the absolute magnitude of the I signal will gradually increase from a value of zero. Since the resulting modulated signal will be $y(t) = I(t) \cos(2\pi f_c t)$, the modulated signal envelope will gradually start from zero during the start-up bit period to avoid spectrum splash. After the start-up period, the system, which is then initialized, produces the I and Q signals as previously described.

At the end of a transmission, the ramp control 73 causes the address generator 72 to address memory portion 58 in the reverse direction for the I signal and to once again not address any memory portion for the Q signal making it gradually go to zero. As a result, during the added end-of- transmission bit period, the Q signal will be zero the absolute magnitude of the I signal will gradually decrease to zero, and the modulated signal envelope will gradually return to zero to once again avoid spectrum splash. This applies to even number of bits in a transmission.

In an application wherein the modulated signal is produced in bursts, with each burst lasting a finite predetermined period of time of, for example, 66 bit periods, the ramp control 73 may include a counter coupled to a system clock. After 66 bit periods have elapsed from the receipt of the first pulse at input 50, the ramp control 73 then inserts the end-of-transmission bit period to complete the burst without spectrum splash being produced.

While a particular embodiment of the present invention has been shown and described, modifications may be made, and it is therefore intended in the appended claims to cover all such changes and modifications which fall within the true spirit and scope of the invention.

What is claimed is:

1. A system for producing a modulation baseband analog signal responsive to serial bits of digital data, said system comprising:

input means for receiving said serial bits of digital data;

memory means including addressable memory locations for storing data representing the waveform amplitudes of said modulation baseband analog signal;

addressing means for addressing selected ones of said memory locations directly responsive to said serial bits of digital data; and digital to analog conversion means coupled to said memory means for receiving said data stored at said memory locations addressed by said addressing means and for converting said data to said modulation baseband analog signal.

2. A system for producing a modulation baseband analog signal responsive to serial bits of digital data, said system comprising:

input means for receiving said serial bits of digital data;

memory means including addressable memory locations for storing data representing the waveform amplitudes of said modulation baseband analog signal;

addressing means for addressing selected ones of said memory locations responsive to said serial bits of digital data; and digital to analog conversion means coupled to said memory means for receiving said data stored at said memory locations addressed by said addressing means and for converting said data to said modulation baseband analog signal, wherein said serial bits of digital data are received at said input means at a predetermined rate with each bit lasting a predetermined bit period and wherein said addressing means addresses said selected ones of said memory locations during each said bit period.

3. A system a defined in claim 2 wherein said modulation baseband analog signal is divisible into a finite number of waveform segments, each said waveform segment corresponding in length to one of said bit periods, wherein said data stored in said memory means includes data for each of said waveform segments, and wherein said addressing means addresses said memory locations for one of said waveform segments during each said bit period.

4. A system as defined in claim 3 wherein said memory means includes a plurality of memory portions, each said portion storing data representing a respective one of said waveform segments, and wherein said system further includes memory portion select means coupled to said addressing means for causing said addressing means to address the memory locations of one of said memory portions responsive to said serial bits of digital data during each said bit period.

5. A system as defined in claim 4 wherein said memory portion select means is responsive to the last three bits of said serial bits of digital data.

6. A system as defined in claim 5 wherein said input means includes a first delay means and a second delay means, said first and second delay means being coupled in series and arranged for delaying said serial bits of digital data by one said bit period, said first and second delay means also being coupled to said memory portion select means for providing said memory portion select means with said last three bits of said serial bits of digital data.

7. A system as defined in claim 4 further including control means for causing said addressing means to address said memory locations in ascending and descending order during alternating ones of said bit periods.

8. A system as defined in claim 4 further including control means coupled to said digital to analog conversion means for causing said digital to analog conversion means to sign inverse said waveform segments during selected one of said bit periods.

9. A system for producing a modulation baseband analog signal responsive to serial bits of digital data, said system comprising:
- input means for receiving said serial bits of digital data;
- memory means including addressable memory locations for storing data representing the waveform amplitudes of said modulation baseband analog signal;
- addressing means for addressing selected ones of said memory locations responsive to said serial bits of digital data; and
- digital to analog conversion means coupled to said memory means for receiving said data stored at said memory locations addressed by said addressing means and for converting said data to said modulation baseband analog signal, wherein said memory means comprises a read only memory.

10. A system for producing a modulation baseband analog signal responsive to serial bits of digital data, said system comprising:
- input means for receiving said serial bits of digital data;
- memory means including addressable memory locations for storing data representing the waveform amplitudes of said modulation baseband analog signal;
- addressing means for addressing selected ones of said memory locations responsive to said serial bits of digital data;
- digital to analog conversion means coupled to said memory means for receiving said data stored at said memory locations addressed by said addressing means and for converting said data to said modulation baseband analog signal; and
- ramp control means coupled to said input and to said addressing means, said ramp control means being responsive to the first one of said serial bits of digital data for causing said addressing means to address predetermined ones of said memory locations to cause the absolute magnitude of said modulation baseband analog signal to gradually increase from a value of zero.

11. A system as defined in claim 10 wherein said ramp control means is responsive to the last one of said serial bits of digital data for causing said addressing means to address said predetermined ones of said memory locations to cause the absolute magnitude of said modulation baseband analog signal to gradually decrease to a value of zero.

12. A system for providing I and Q baseband analog modulation signals for use in GMSK modulation responsive to serial bits of digital data, said I baseband modulation signal being represented by $I(t) = \cos[2\pi f_m \int g(t)dt]$ and said Q baseband modulation signal being represented by $Q(t) = \sin[2\pi f_m \int g(t)dt]$, wherein $f_m$ is the modulating frequency and $g(t)$ is a filtered version of said serial bits of digital data, said system comprising:
- input means for receiving said serial bits of digital data;
- memory mans including addressable memory locations for storing data representing the waveform amplitudes of said I and Q modulation baseband analog signals;
- addressing means for addressing selected ones of said memory locations directly responsive to said serial bits of digital data; and
- digital to analog conversion means coupled to said memory means for receiving said data stored at said memory locations addressed by said addressing means and for converting said data to said I and Q modulation baseband analog signals.

13. A system for providing I and Q baseband analog modulation signals for use in GMSK modulation responsive to serial bits of digital data, said I baseband modulation signal being represented by $I(t) = \cos[2\pi f_m \int g(t)dt]$ and said Q baseband modulation signal being represented by $Q(t) = \sin[2\pi f_m \int g(t)dt]$, wherein $f_m$ is the modulating frequency and $g(t)$ is a filtered version of said serial bits of digital data, said system comprising:
- input means for receiving said serial bits of digital data;
- memory means including addressable memory locations for storing data representing the waveform amplitudes of said I and Q modulation baseband analog signals;
- addressing means for addressing selected ones of said memory locations responsive to said serial bits of digital data; and
- digital to analog conversion means coupled to said memory means for receiving said data stored at said memory locations addressed by said addressing means and for converting said data to said I and Q modulation baseband analog signals, wherein said serial bits of digital data are received at said input means at a predetermined rate with each bit lasting a predetermined bit period and wherein said addressing means addresses said selected ones of said memory locations for both said I and Q signals during each said bit period.

14. A system as defined in claim 13 wherein said I and Q modulation baseband analog signals are divisible into a finite number of waveform segments, each said waveform segment corresponding in length to one of said bit periods, wherein said data stored in said memory means includes data for each of said waveform segments, and wherein said addressing means addresses said memory locations for one of said waveform segments corresponding to said I signal and one of said waveform segments corresponding to said Q signal during each said bit period.

15. A system as defined in claim 14 wherein said memory means includes a plurality of memory portions, each said memory portion storing data representing a respective one of said waveform segments, and wherein said system further includes waveform segment select means for causing said addressing means to address the memory locations of one of said memory portions for said I signal and the memory locations of one of said memory portions for said Q signal responsive to said serial bits of digital data during each said bit period.

16. A system as defined in claim 15 wherein said waveform segment select means is responsive to the last three bits of said serial bits of digital data.

17. A system as defined in claim 16 wherein said input means includes a first delay means and a second delay means, said first and second delay means being coupled in series and arranged for delaying said serial bits of digital data by one said bit period, said first and second delay means also being coupled to said waveform segment select means for providing said waveform segment select means with said last three bits of said serial bits of digital data.

18. A system as defined in claim 15 further including read direction control means coupled to said addressing means for causing said addressing means to address said addressable memory in reverse order during alternating ones of said bit periods.

19. A system as defined in claim 18 wherein said read direction control means causes said addressing means to address said memory locations in reverse order for said I signal during odd numbered bit periods and for said Q signal during even numbered bit periods.

20. A system as defined in claim 18 further including arithmetic sign control means for causing the polarity of said waveform segments to be inverted during selected ones of said bits periods.

21. A system as defined in claim 20 wherein said sign control means is coupled to said digital to analog conversion means for causing said digital to analog conversion means to sign invert said waveform segments during selected ones of said bit periods.

22. A system as defined in claim 20 wherein said memory means comprises a read only memory.

23. A system as defined in claim 20 wherein said memory means include four said memory portions.

24. A system as defined in claim 15 further including quadrant determining means coupled to said input means for determining the quadrant of said I and Q waveform segments during each said bit period.

25. A system as defined in claim 24 wherein said quadrant determining means is arranged to provide a two-bit representation for each said quadrant including; 0,0 for the first quadrant; 0,1 for the second quadrant; 1,0 for the third quadrant; and 1,1 for the fourth quadrant.

26. A system as defined in claim 25 wherein said waveform segment select means is responsive to the last three bits of said serial bits of digital data and to the least significant-bit of said two-bit quadrant representation provided by said quadrant determining means.

27. A system as defined in claim 26 wherein said quadrant determining means is responsive to the last two bits of said serial bits of data for providing said two-bit quadrant representation.

28. A system as defined in claim 25 wherein said last three bits of said serial bits of data are $b(n+1)$, $b(n)$, and $b(n-1)$, wherein bit $b(n+1)$ is the last received bit of said serial bits, wherein said two-bit quadrant representation is $Q_1$, $Q_0$ and wherein said system further includes read direction control means coupled to said addressing means for causing said addressing means to address said memory locations in reverse order for said I signal when $Q_0$ XOR $b(n)$ is equal to a logical one and for causing said addressing means to address said memory locations in reverse order for said Q signal when $Q_0$ XOR $b(n)$ is equal to a logical zero.

29. A system as defined in claim 28 further including sign control means coupled to said digital to analog conversion means and to said quadrant determining means for causing said digital to analog conversion means to sign invert said Q signal waveform segments when $Q_1$ is equal to a logical one and to sign invert said I signal waveform segments when $Q_0$ XOR $Q_1$ is equal to a logical one.

30. A system as defined in claim 29 wherein said quadrant determining means comprises a modulo 4, 2-bit counter having a first input for receiving said $b(n)$ bit and a second input for receiving said $b(n+1)$ bit.

31. A system as defined in claim 15 wherein said memory means comprises 256 memory locations, wherein each said memory portion includes 64 memory locations, and wherein each said memory location stores six bits of data.

32. A system as defined in claim 15 wherein said digital to analog conversion means comprises a first digital to analog converter for providing said I signal and a second digital to analog converter for providing said Q signal.

33. A system as defined in claim 32 wherein said addressing means is arranged for alternatingly addressing said memory means for said I and Q waveform segments data and wherein said system further includes gate means coupled between said memory means and said first and second digital to analog converters for selectively coupling said memory means to said first digital to analog converter when said memory means is addressed for said I waveform segment data and to said second digital to analog converter when said memory means is addressed for said Q waveform segment data.

34. A system as defined in claim 33 further including delay means coupled between said gate means and one of said first or second digital to analog converters for aligning said I and Q signals.

35. A system as defined in claim 33 wherein said gate means are coupled to said addressing means and are controlled by said addressing means for said selective coupling.

36. A system as defined in claim 35 further including first and second outputs for providing said I and Q signals respectively, a first filter means coupling said first digital to analog converter to said first output and a second filter means coupling said second digital to analog converter to said second output.

37. A system as defined in claim 36 wherein said first and second filter means each comprise a low-pass filter.

38. A system for providing I and Q baseband analog modulation signals for use in GMSK modulation responsive to serial bits of digital data, said I baseband modulation signal being represented by $I(t) = \cos[2\pi f_m \int g(t)dt]$ and said Q baseband modulation signal being represented by $Q(t) = \sin[2\pi f_m \int g(t)dt]$, wherein $f_m$ is the modulating frequency and $g(t)$ is a filtered version of said serial bits of digital data, said system comprising:

input means for receiving said serial bits of digital data;

memory means including addressable memory locations for storing data representing the waveform amplitudes of said I and Q modulation baseband analog signals;

addressing means for addressing selected ones of said memory locations responsive to said serial bits of digital data;

digital to analog conversion means coupled to said memory means for receiving said data stored at said memory locations addressed by said addressing means and for converting said data to said I and Q modulation baseband analog signals; and ramp control means coupled to said input and to said addressing means, said ramp control means being responsive to the first one of said serial bits of digital data for causing said addressing means to address predetermined ones of said memory locations to cause the absolute magnitude of said I modulation baseband analog signal to gradually increase from a value of zero and to cause said Q modulation baseband analog signal to have a value of zero.

39. A system as defined in claim 38 wherein said ramp control means is responsive to the last one of said serial bits of digital data for causing said addressing means to address said predetermined ones of said memory locations to cause the absolute magnitude of said I modulation baseband analog signal to gradually decrease to a value of zero and to cause said Q modulation baseband analog signal to have a value of zero.

40. A method of producing a modulation baseband analog signal responsive to serial bits of digital data, said method comprising the steps of:
providing memory including addressable memory locations;
storing data representing the waveform amplitudes of said modulation baseband analog signal in said memory; receiving said serial bits of digital data;
addressing selected ones of said memory locations directly responsive to said serial bits of digital data; and
converting said data stored at said addressed memory locations to analog form for providing said modulation baseband analog signal.

41. A method of producing a modulation baseband analog signal responsive to serial bits of digital data, said method comprising the steps of:
providing memory including addressable memory locations;
storing data representing the waveform amplitudes of said modulation baseband analog signal in said memory; receiving said serial bits of digital data;
addressing selected ones of said memory locations responsive to said serial bits of digital data; and
converting said data stored at said addressed memory locations to analog form for providing said modulation baseband analog signal,
wherein said serial bits of digital data are received at a predetermined rate with each bit lasting a predetermined bit period and wherein said addressing step includes addressing said selected ones of said memory locations during each said bit period.

42. A method as defined in claim 41 wherein said modulation baseband analog signal is divisible into a finite number of waveform segments, each said waveform segment corresponding in length to one of said bit periods, wherein said storing step includes storing data for each of said waveform segments, and wherein said addressing step includes addressing said memory locations for one of said waveform segments during each said bit period.

43. A method as defined in claim 42 further including the steps of providing said memory means with a plurality of memory portions, storing within each said portion data representing a respective on of said waveform segments, and causing said addressing means to address the memory locations of a selected one of said memory portions responsive to said serial bits of digital data during each said bit period.

44. A method as defined in claim 43 wherein said selected memory portion is addressed responsive to the last received three bits of said serial bits of digital data.

45. A method as defined in claim 43 wherein said addressing step includes addressing said memory locations in ascending and descending order during alternating ones of said bit periods.

46. A method as defined in claim 43 further including the step of inverting the sign of said waveform segments during selected one of said bit periods.

47. A method as defined in claim 42 wherein said memory comprises a read only memory.

48. A method of producing a modulation baseband analog signal responsive to serial bits of digital data, said method comprising the steps of:
providing memory including addressable memory locations;
storing data representing the waveform amplitudes of said modulation baseband analog signal in said memory; receiving said serial bits of digital data;
addressing selected ones of said memory locations responsive to said serial bits of digital data;
converting said data stored at said addressed memory locations to analog form for providing said modulation baseband analog signal; and
receiving the first one of said serial bits of digital data and immediately thereafter addressing predetermined ones of said memory locations to cause the absolute magnitude of said modulation baseband analog signal to gradually increase from a value of zero.

49. A method as defined in claim 48 including the further steps of receiving the last one of said serial bits of digital data and thereafter addressing said predetermined one of said memory locations to cause the absolute magnitude of said modulation baseband analog signal to gradually decrease to a value of zero.

50. A method for providing I and Q baseband analog modulation signals for use in GMSK modulation responsive to serial bits of digital data, said I baseband modulation signal being represented by $I(t) = \cos[2\pi f_m \int g(t)dt]$ and said Q baseband modulation signal being represented by $Q(t) = \sin[2\pi f_m \int g(t)dt]$, wherein $f_m$ is the modulating frequency and $g(t)$ is a filtered version of said serial bits of digital data, said method comprising the steps of:
receiving said serial bits of digital data;
providing memory including addressable memory locations;
storing data representing the waveform amplitudes of said I and Q modulation baseband analog signals in said memory;
addressing selected ones of said memory locations directly responsive to said serial bits of digital data; and
converting said data stored at said addressed memory locations to analog form for providing said I and Q modulation baseband analog signals.

51. A method for providing I and Q baseband analog modulation signals for use in GMSK modulation responsive to serial bits of digital data, said I baseband modulation signal being represented by $I(t) = \cos[2\pi f_m \int g(t)dt]$ and said Q baseband modulation signal being represented by $Q(t) = \sin[2\pi f_m \int g(t)dt]$, wherein $f_m$ is the modulating frequency and $g(t)$ is a filtered version of said serial bits of digital data, said method comprising the steps of:

receiving said serial bits of digital data;

providing memory including addressable memory locations;

storing data representing the waveform amplitudes of said I and Q modulation baseband analog signals in said memory;

addressing selected ones of said memory locations responsive to said serial bits of digital data; and converting said data stored at said addressed memory locations to analog form for providing said I and Q modulation baseband analog signals, wherein said serial bits of digital data are received at said input means at a predetermined rate with each bit lasting a predetermined bit period and wherein said addressing step includes addressing said selected ones of said memory locations for both said I and Q signals during each said bit period.

52. A method as defined in claim 51 wherein said I and Q modulation baseband analog signals are dividable into a finite number of waveform segments, each said waveform segment corresponding in length to one of said bit periods, wherein said storing step includes storing in said memory data for each of said waveform segments, and wherein said addressing step includes addressing said memory locations for one of said waveform segments corresponding to said I signal and one of said waveform segments corresponding to said Q signal during each said bit period.

53. A method as defined in claim 52 including the further steps of providing said memory with a plurality of memory portions, each said memory portion storing data representing a respective one of said waveform segments, and causing said addressing means to address the memory locations of a selected one of said memory portions for said I signal and the memory locations of a selected one of said memory portions for said Q signal responsive to said serial bits of digital data during each said bit period.

54. A method as defined in claim 53 wherein said selected memory portions are addressed responsive to the last three received bits of said serial bits of digital data.

55. A method as defined in claim 53 wherein said addressing step includes addressing said addressable memory location in reverse order during alternating ones of said bit periods.

56. A method as defined in claim 55 wherein said addressing step further includes addressing said memory locations in reverse order for said I signal during odd numbered bit periods and for said Q signal during even numbered bit periods.

57. A method as defined in claim 55 further including the step of inverting the sign of said waveform segments during selected ones of said bits periods.

58. A method as defined in claim 57 wherein said inverting step is performed as said addressed data is converted to analog form.

59. A method as defined in claim 57 wherein said memory comprises a read only memory.

60. A method as defined in claim 57 wherein said memory is provided with four said memory portions.

61. A method as defined in claim 53 further including the step of determining the quadrant of said I and Q waveform segments during each said bit period.

62. A method as defined in claim 61 wherein said determining step includes providing a two-bit representation for each said quadrant including; 0,0 for the first quadrant; 0,1 for the second quadrant; 1,0 for the third quadrant; and 1,1 for the fourth quadrant.

63. A method as defined in claim 62 wherein said addressing step includes addressing said selected memory portion responsive to the last three received bits of said serial bits of digital data and to the least significant-bit of said two-bit quadrant representation.

64. A method as defined in claim 63 wherein said quadrant representation is provided responsive to the last two received bits of said serial bits of data.

65. A system as defined in claim 62 wherein said last three received bits of said serial bits of data are $b(n+1)$, $b(n)$, and $b(n-1)$, wherein bit $b(n+1)$ is the last received bit of said serial bits, wherein said two-bit quadrant representation is $Q_1$, $Q_0$ and wherein said addressing step includes addressing said memory locations in reverse order for said I signal when $Q_0$ XOR $b(n)$ is equal to a logical one and addressing said memory locations in reverse order for said Q signal when $Q_0$ XOR $b(n)$ is equal to a logical zero.

66. A method as defined in claim 65 further including the step of inverting the sign of said Q signal waveform segments when $Q_1$ is equal to a logical one and inverting the sign of said I signal waveform segments when $Q_0$ XOR $Q_1$ is equal to a logical one.

67. A method as defined in claim 65 wherein said addressing step includes alternatingly addressing said memory means for said I and Q waveform segment data.

68. A method for providing I and Q baseband analog modulation signals for use in GMSK modulation responsive to serial bits of digital data, said I baseband modulation signal being represented by $I(t) = \cos[2\pi f_m \int g(t)dt]$ and said Q baseband modulation signal being represented by $Q(t) = \sin[2\pi f_m \int g(t)dt]$, wherein $f_m$ is the modulating frequency and $g(t)$ is a filtered version of said serial bits of digital data, said method comprising the steps of:

receiving said serial bits of digital data;

providing memory including addressable memory locations;

storing data representing the waveform amplitudes of said I and Q modulation baseband analog signals in said memory;

addressing selected ones of said memory locations responsive to said serial bits of digital data;

converting said data stored at said addressed memory locations to analog form for providing said I and Q modulation baseband analog signals; and receiving the first one of said serial bits of digital data and immediately thereafter addressing predetermined ones of said memory locations to cause the absolute magnitude of said I modulation baseband analog signal to gradually increase from a value of zero and to cause said Q modulation baseband analog signal to have a value of zero.

69. A method as defined in claim 68 including the further steps of receiving the last one of said serial bits of digital data and thereafter addressing said predetermined one of said memory locations to cause the absolute magnitude of said I modulation baseband analog signal to gradually decrease to a value of zero and to cause said Q modulation baseband analog signal to have a value of zero.

* * * * *